US012177522B2

(12) United States Patent
Yang et al.

(10) Patent No.: US 12,177,522 B2
(45) Date of Patent: Dec. 24, 2024

(54) SMART TELEVISION AND SERVER

(71) Applicant: Hisense Visual Technology Co., Ltd., Qingdao (CN)

(72) Inventors: Shansong Yang, Qingdao (CN); Gang Cheng, Qingdao (CN); Xingyang Shao, Qingdao (CN); Siyao Jiang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 233 days.

(21) Appl. No.: 17/411,613

(22) Filed: Aug. 25, 2021

(65) Prior Publication Data

US 2021/0392403 A1   Dec. 16, 2021

Related U.S. Application Data

(63) Continuation of application No. PCT/CN2020/085547, filed on Apr. 20, 2020.

(30) Foreign Application Priority Data

Nov. 29, 2019 (CN) .......................... 201911207629.2
Mar. 13, 2020 (CN) .......................... 202010175182.1

(51) Int. Cl.
*H04N 21/472* (2011.01)
*G06F 3/16* (2006.01)
(Continued)

(52) U.S. Cl.
CPC ........... *H04N 21/472* (2013.01); *G06F 3/167* (2013.01); *G10L 13/033* (2013.01); *G10L 15/08* (2013.01);
(Continued)

(58) Field of Classification Search
CPC ....... H04N 21/42204; H04N 21/42222; H04N 21/431; H04N 21/472; H04N 21/47202; H04N 21/4788; H04N 21/8405
See application file for complete search history.

(56) References Cited

U.S. PATENT DOCUMENTS 10,610,111 B1 *   4/2020  Tran ...................... A61B 5/411
2004/0078814 A1 * 4/2004  Allen .................. H04N 21/4781
                                                              725/135
(Continued)

FOREIGN PATENT DOCUMENTS

CN        103270473 A       8/2013
CN        108846125 A      11/2018
(Continued)

OTHER PUBLICATIONS

Chinese Office Action, mailed Mar. 1, 2022, from Chinese Patent Application No. 202110603578.6.

*Primary Examiner* — Rong Le
(74) *Attorney, Agent, or Firm* — ANOVA LAW GROUP, PLLC

(57) ABSTRACT

The present disclosure discloses a smart television and a server. In the present disclosure, a query command comprising a keyword is sent to a server in response to a query request for an audio/video from the user input interface, wherein the server is configured to determine media resource information of corresponding target audio/video according to the keyword in response to receiving the query command, and generate a reply text comprising comment information of the target audio/video according to the keyword; the media resource information and the reply text sent from the server are received; and the display is controlled to present the media resource information in a first area on the user interface and present the reply text in a second area on the user interface.

18 Claims, 11 Drawing Sheets

Figure 1:
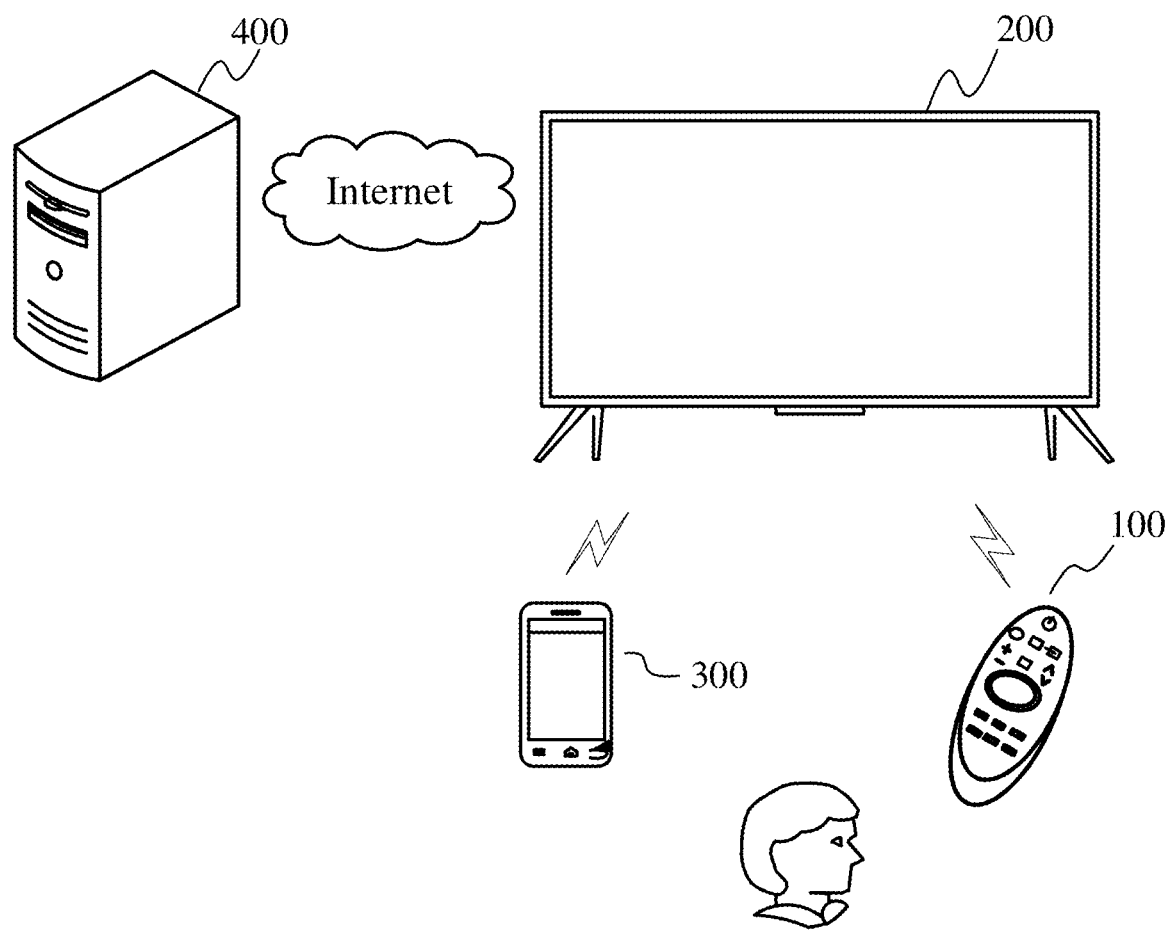

(51) Int. Cl.
  *G10L 13/033*   (2013.01)
  *G10L 15/08*    (2006.01)
  *G10L 15/22*    (2006.01)
  *H04N 21/422*   (2011.01)
  *H04N 21/4788*  (2011.01)
  *H04N 21/8405*  (2011.01)
  *H04R 1/02*     (2006.01)
  *H04R 3/00*     (2006.01)

(52) U.S. Cl.
  CPC ....... *G10L 15/22* (2013.01); *H04N 21/42222* (2013.01); *H04N 21/4788* (2013.01); *H04N 21/8405* (2013.01); *H04R 1/028* (2013.01); *H04R 3/00* (2013.01); *G10L 2015/088* (2013.01); *G10L 2015/223* (2013.01); *H04R 2499/15* (2013.01)

(56) References Cited

U.S. PATENT DOCUMENTS

| | | | |
|---|---|---|---|
| 2014/0196092 A1* | 7/2014 | Chung | G10L 19/265 |
| | | | 725/53 |
| 2021/0090555 A1* | 3/2021 | Mahmood | G10L 13/033 |

FOREIGN PATENT DOCUMENTS

| | | |
|---|---|---|
| CN | 109151548 A | 1/2019 |
| CN | 109213894 A | 1/2019 |
| CN | 109427334 A | 3/2019 |
| CN | 109474843 A | 3/2019 |
| CN | 109902158 A | 6/2019 |
| CN | 110022258 A | 7/2019 |

* cited by examiner

SMART TELEVISION AND SERVER

CROSS-REFERENCE TO RELATED APPLICATIONS

This application is a continuation application of International Application No. PCT/CN2020/085547 filed Apr. 20, 2020, which claims the benefit and priority of Chinese Patent Application No. 201911207629.2 filed Nov. 29, 2019, and Chinese Patent Application No. 202010175182.1 filed Mar. 13, 2020. The entire disclosures of the above applications are incorporated herein by reference.

FIELD

The present disclosure relates to the communication field, and particularly to a smart television and a server.

BACKGROUND

This section provides background information related to the present disclosure which is not necessarily prior art.

Smart devices (such as smart televisions, smart speakers, smart phones, etc.) can provide users with the service meeting the user demands based on the user requests due to their ability to interact with the users, and thus are more and more widely used.

Taking a smart television as an example, a user can issue a voice command to ask for a movie to play (for example, "I want to watch ABC", here "ABC" is a movie name), and the smart television can recognize, by parsing the voice command, the movie name as a keyword for query, and display the play resource of the movie on the interface after finding them. The smart television may also respond to the user with voice message (for example "find a video about ABC for you, please select for playing").

How to increase the diversity of responses to improve the user experience is a problem which needs to be solved at present.

SUMMARY

This section provides a general summary of the disclosure, and is not a comprehensive disclosure of its full scope or all of its features.

The exemplary embodiments of the present disclosure provide a smart television and a server, so as to increase the diversity of reply texts and improve the user experience when replying to the user's query request for audio/video in the human-machine interaction scenario.

According to an aspect of an exemplary embodiment, a smart television is provided, including a user input interface, a display and a controller. The user input interface is configured to receive an input from a user. The display is configured to present a user interface. The controller is in communication with the user input interface and an audio output and is configured to:
  in response to a first query request for audio/video from the user input interface, send a first query command comprising a keyword to a server, wherein the server is configured to determine media resource information of a corresponding target audio/video according to the keyword in response to receiving the first query command, and generate a first reply text comprising comment information of the target audio/video according to the keyword;
  receive the media resource information and the first reply text sent from the server;
  and control the display to present the media resource information in a first area on the user interface and present the first reply text in a second area on the user interface.

According to an aspect of an exemplary embodiment, a smart television is provided, including a user input interface, a display and a controller. The user input interface is configured to receive an input from a user. The display is configured to present a user interface. The controller is in communication with the user input interface and an audio output and is configured to:
  in response to a first query request for audio/video from the user input interface, send a first query command comprising a keyword to a server, wherein the server is configured to:
  determine media resource information of a corresponding target audio/video according to the keyword and obtain attribute information of the keyword according to the keyword,
  and generate a first reply text according to a preset template randomly selected among multiple preset templates and the attribute information, and the first reply texts for two consecutive query requests for a same audio/video are set to be random; receive the media resource information and the first reply text sent from the server; and control the display to present the media resource information in a first area on the user interface and present the first reply text in a second area on the user interface.

According to an aspect of an exemplary embodiment, a smart television is provided, including a user input interface, a display and a controller. The user input interface is configured to receive an input from a user. The display is configured to present a user interface. The controller is in communication with the user input interface and an audio output and is configured to:
  in response to a first query request for audio/video from the user input interface, send a first query command comprising a keyword to a server, wherein the server is configured to:
  determine media resource information of a corresponding target audio/video according to the keyword and obtain attribute information of the keyword according to the keyword, and generate a first reply text according to a preset template randomly selected among multiple preset templates and the attribute information, and the first reply texts for two consecutive query requests for a same audio/video are different;
  receive the media resource information and the first reply text sent from the server; and control the display to present the media resource information in a first area on the user interface and present the first reply text in a second area on the user interface.

According to an aspect of an exemplary embodiment, a smart television is provided, including a user input interface, a display and a controller. The user input interface is configured to receive an input from a user. The display is configured to present a user interface. The controller is in communication with the user input interface and an audio output and is configured to:
  in response to a first query request for audio/video from the user input interface, send a first query command comprising a keyword to a server, wherein the server is configured to:

determine media resource information of a corresponding target audio/video according to the keyword and obtain attribute information of the keyword according to the keyword, and select a first reply text among multiple candidate reply texts generated based on the attribute information, and the first reply texts selected for two consecutive query requests for a same audio/video are random;

receive the media resource information and the first reply text sent from the server; and control the display to present the media resource information in a first area on the user interface and present the first reply text in a second area on the user interface.

According to a second aspect of an exemplary embodiment, a server is provided. The server is configured to:

receive a first query command comprising a keyword sent from a smart television;

determine media resource information of a target audio/video according to the keyword in response to receiving the first query command, and generate a first reply text comprising comment information of the target audio/video according to the keyword;

and send the media resource information and the first reply text to the smart television, to cause the smart television to present the media resource information in a first area on a user interface and present the first reply text in a second area on the user interface.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 exemplarily shows a schematic diagram of an operation scene between a display device and a control device according to an embodiment.

Figure 2:
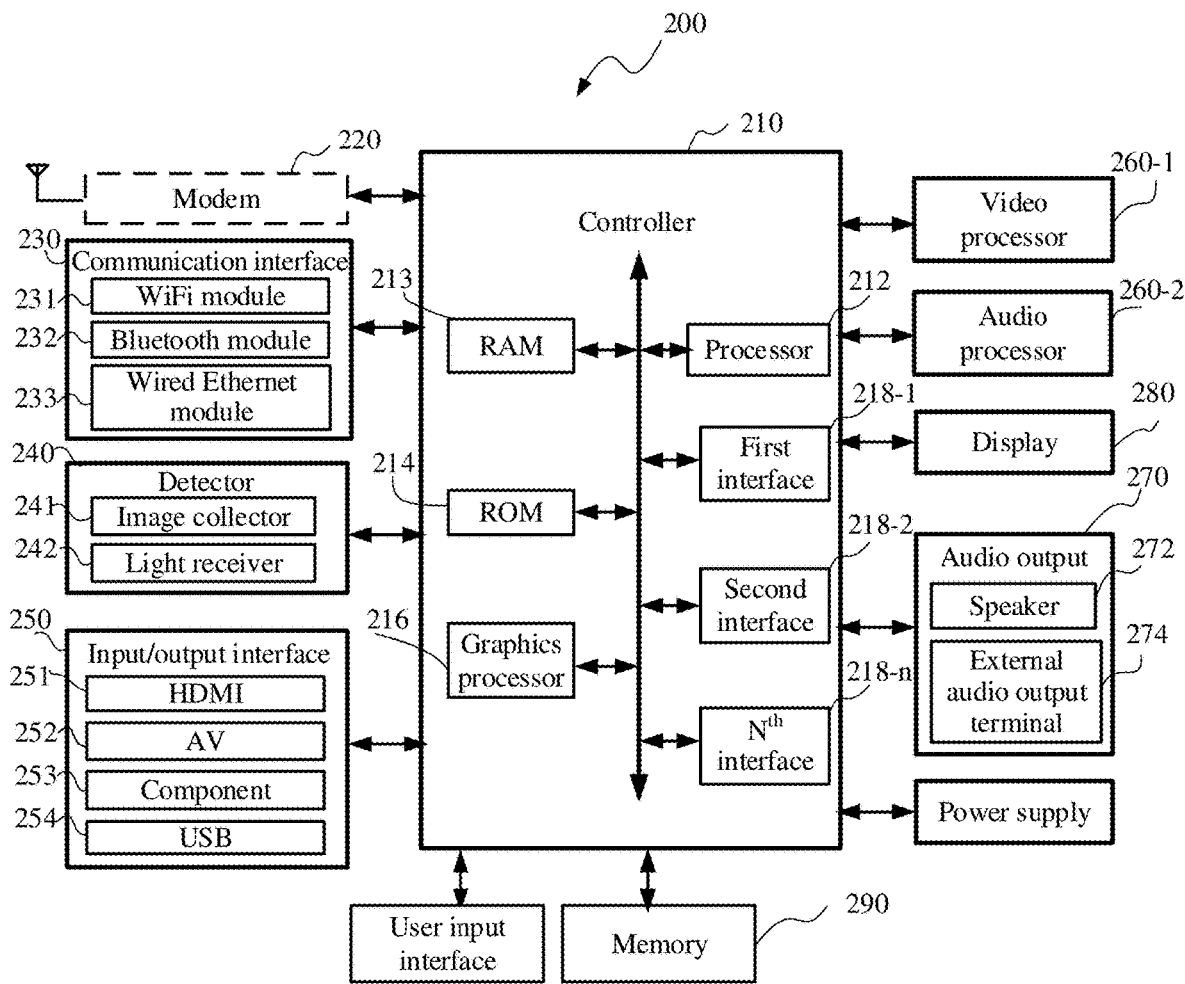

FIG. 2 exemplarily shows a block diagram of the hardware configuration of the display device 200 according to an embodiment.

Figure 3:
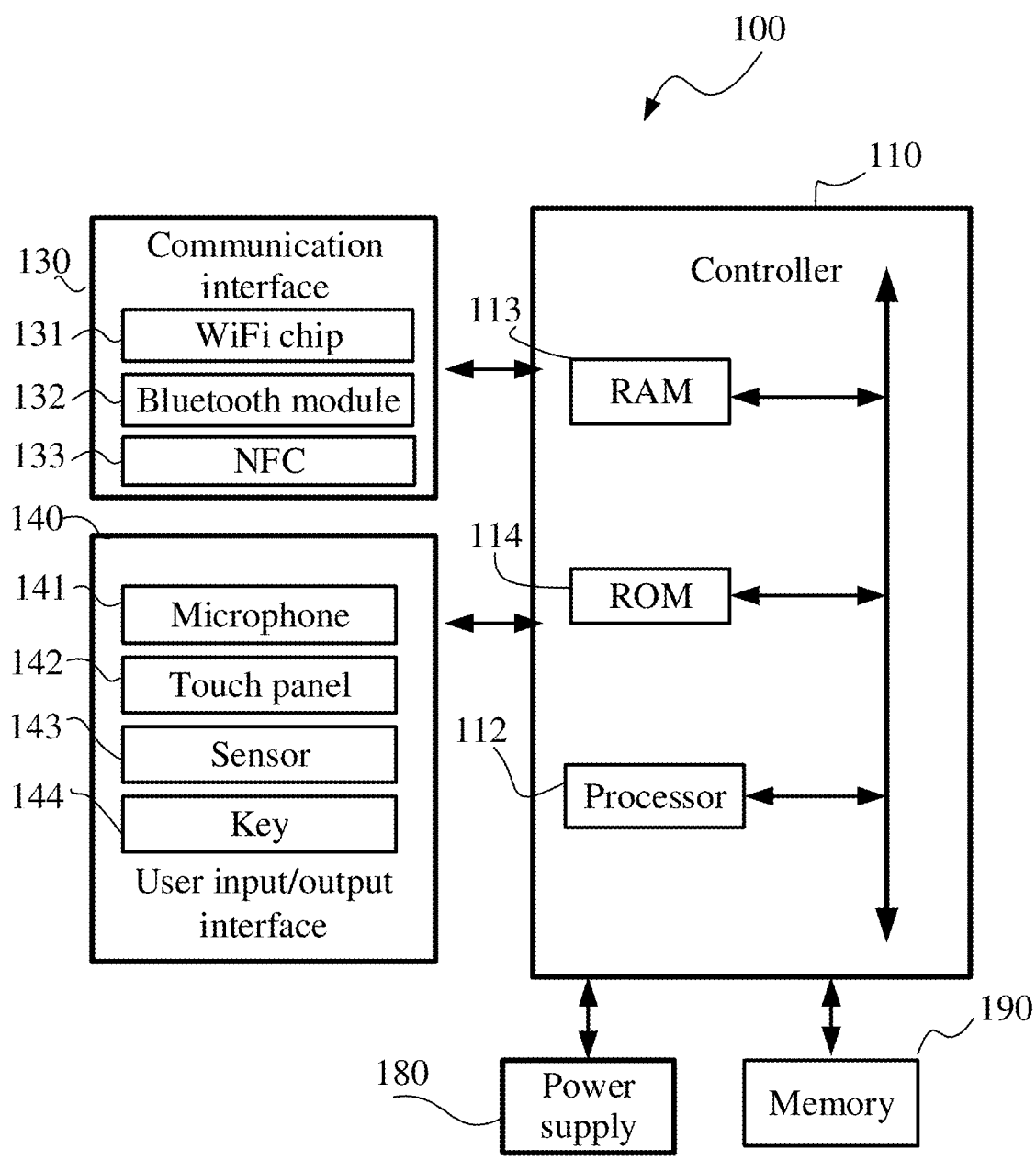

FIG. 3 exemplarily shows a block diagram of the hardware configuration of the control device 100 according to an embodiment.

Figure 4:
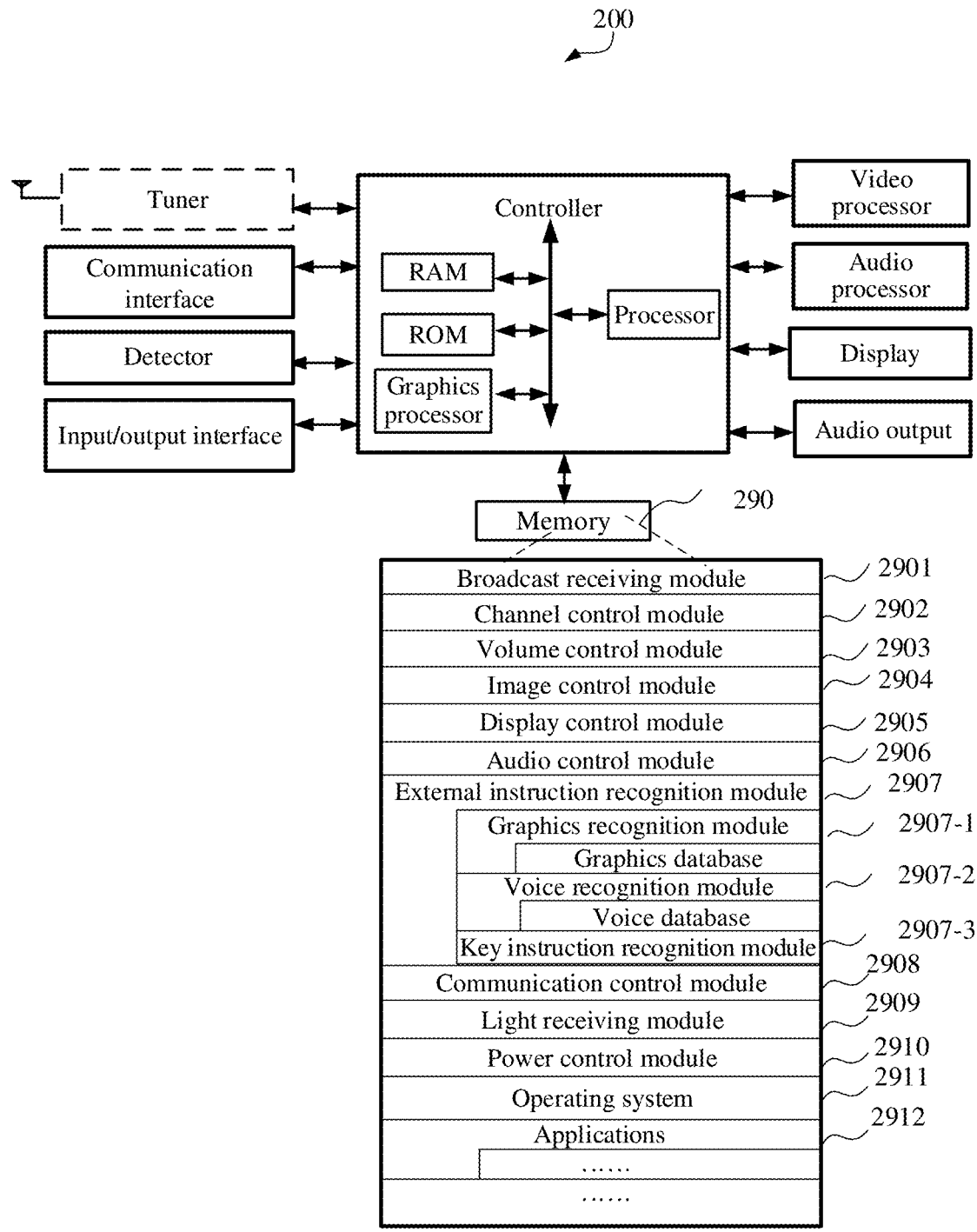

FIG. 4 exemplarily shows a schematic diagram of the functional configuration of the display device 200 according to an embodiment.

Figure 5A:
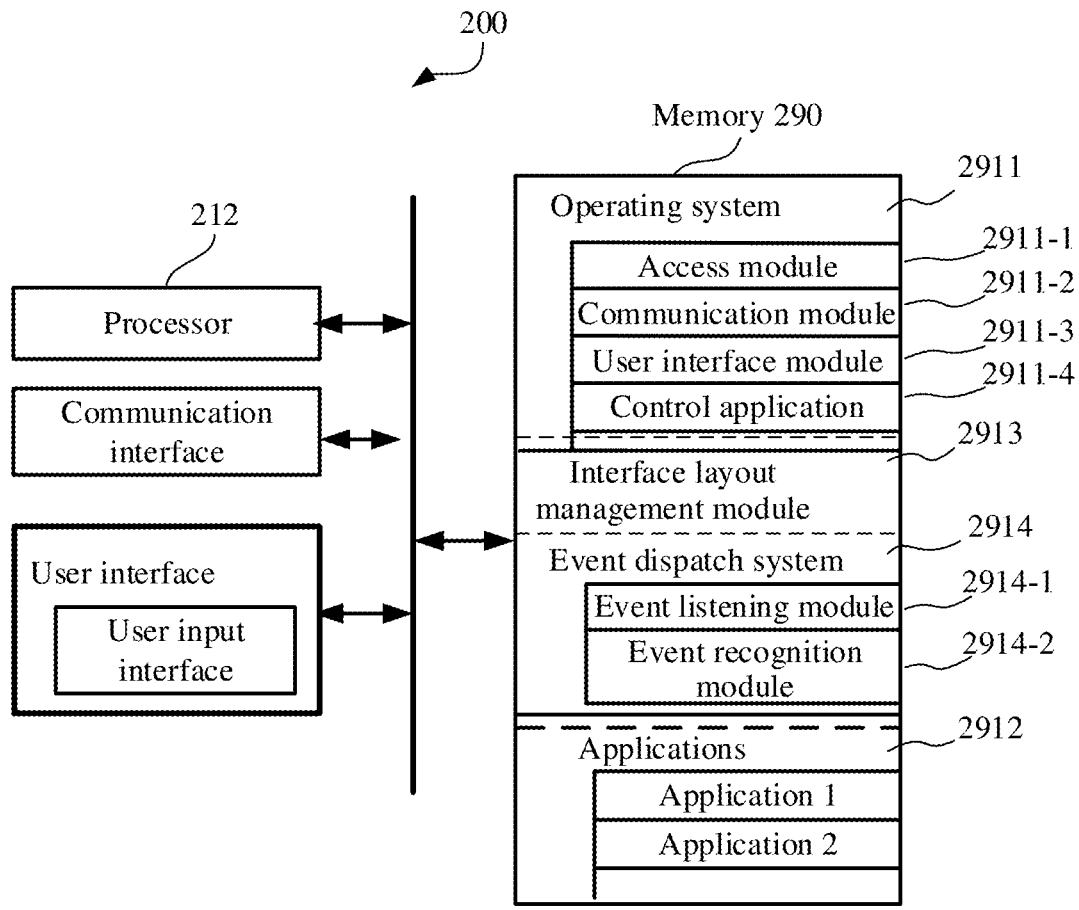

FIG. 5A exemplarily shows a schematic diagram of the software configuration in the display device 200 according to an embodiment.

Figure 5B:
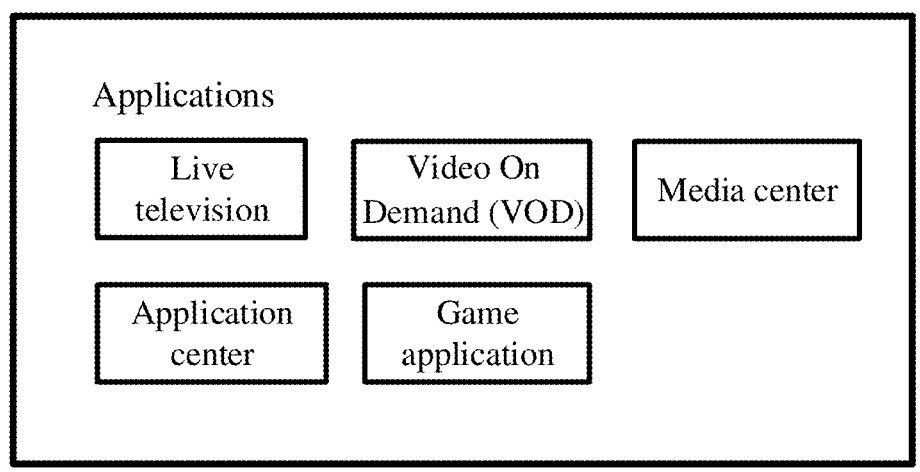

FIG. 5B exemplarily shows a schematic diagram of the application configuration in the display device 200 according to an embodiment.

Figure 6:
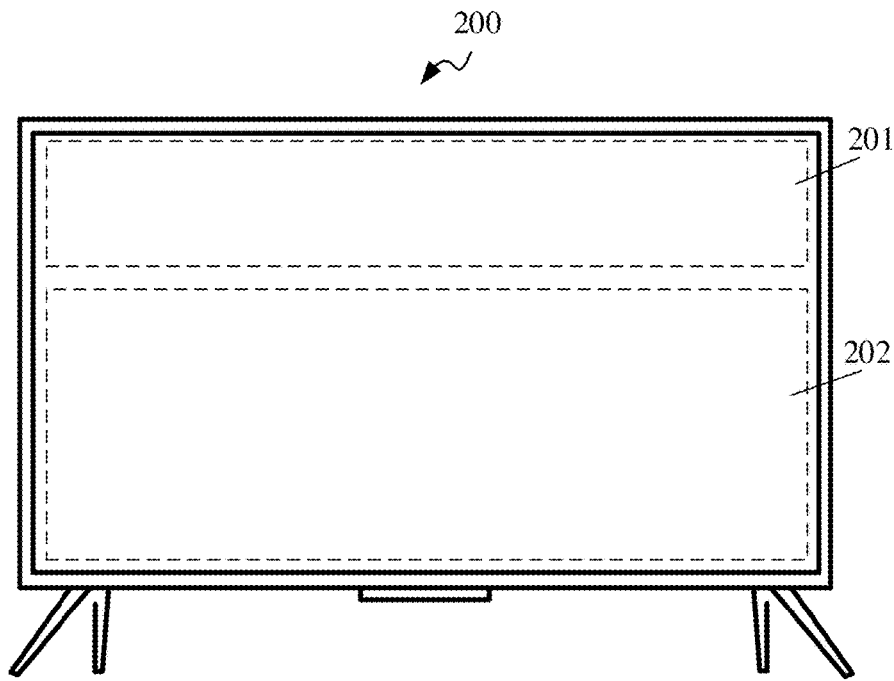

FIG. 6 exemplarily shows a schematic diagram of the user interface in the display device 200 according to an exemplary embodiment.

Figure 7:
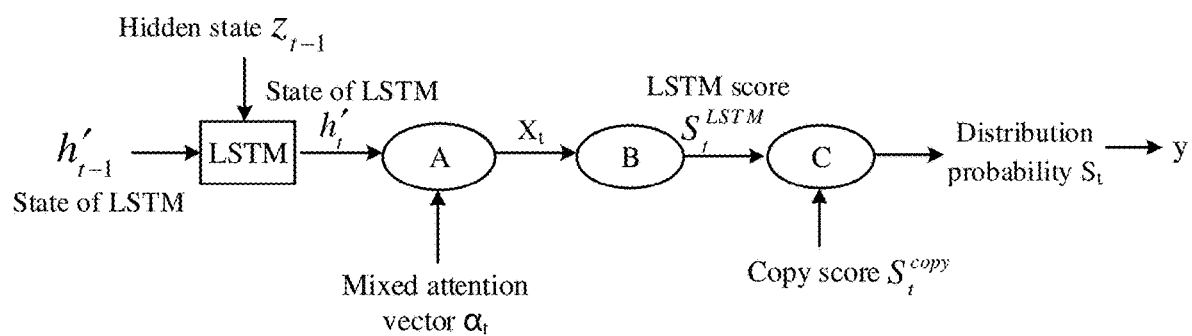

FIG. 7 exemplarily shows a partial schematic diagram of a text generation model combining a neural network with templates and using a mixed attention mechanism according to an exemplary embodiment.

Figure 8:
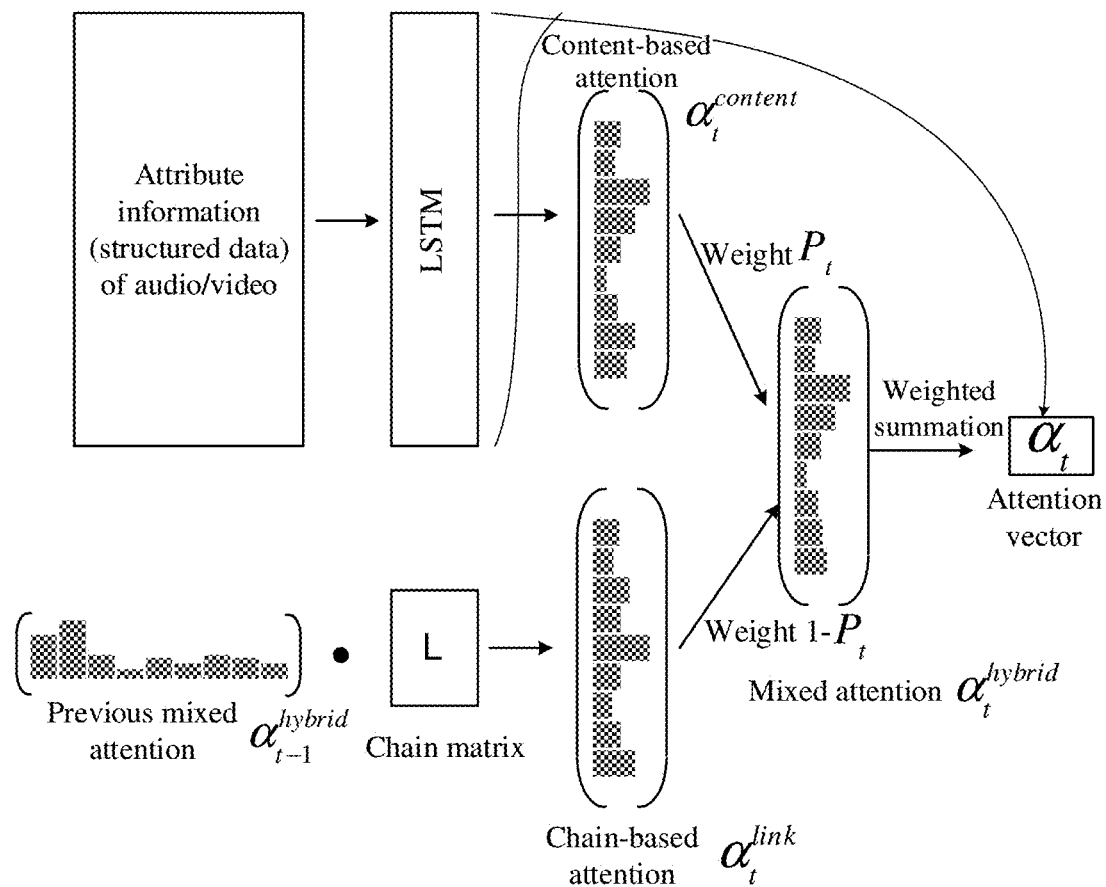

FIG. 8 exemplarily shows a schematic diagram of the mixed attention mechanism according to an embodiment.

Figure 9:
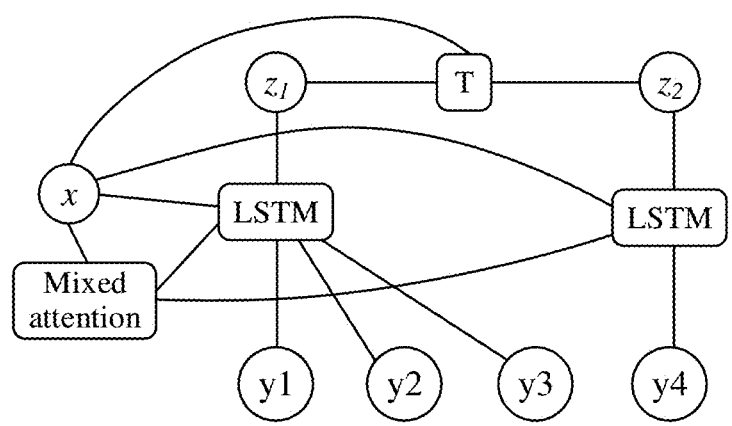

FIG. 9 exemplarily shows an overall schematic diagram of the text generation model combining the neural network with templates and using the mixed attention mechanism according to an embodiment.

Figure 10:
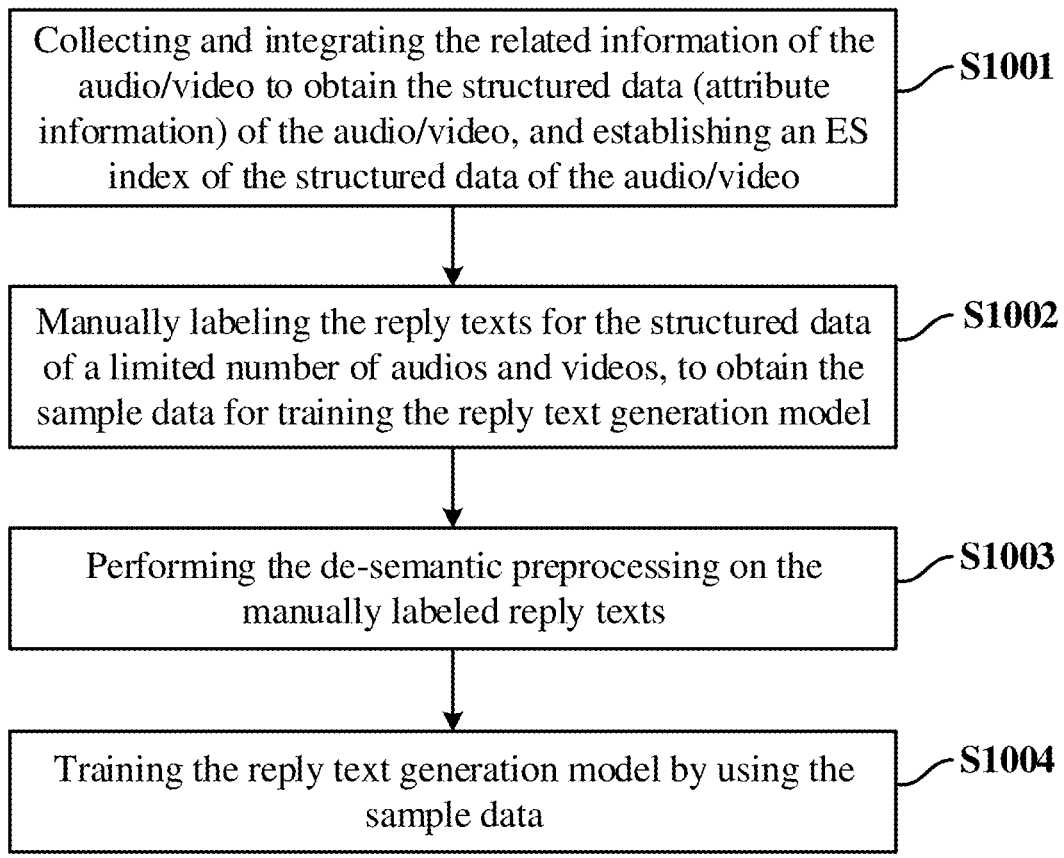

FIG. 10 exemplarily shows a schematic diagram of a training process of a reply text generation model according to an embodiment.

Figure 11:
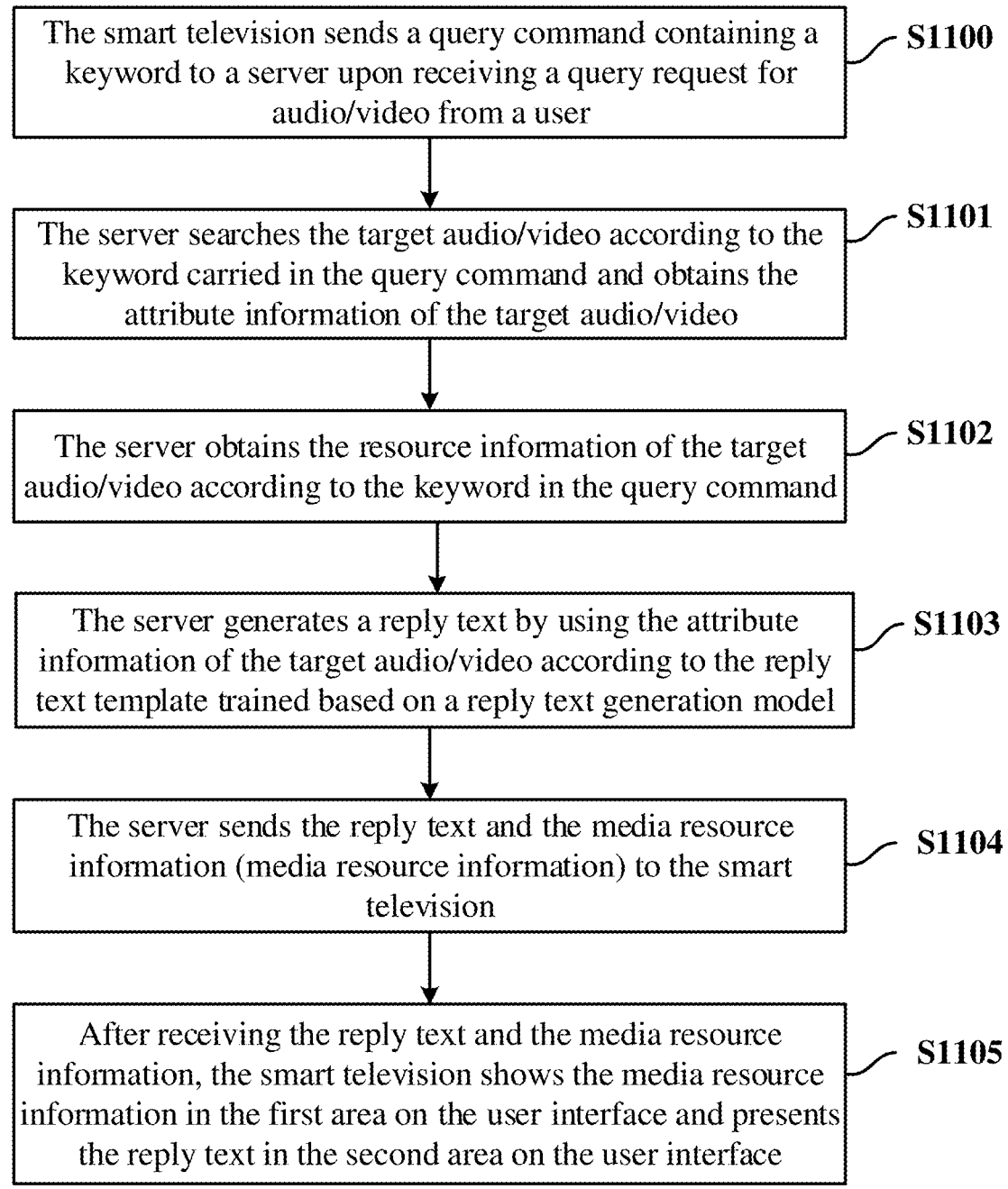

FIG. 11 exemplarily shows a flow in response to an audio/video query request according to an embodiment.

Figure 12A:
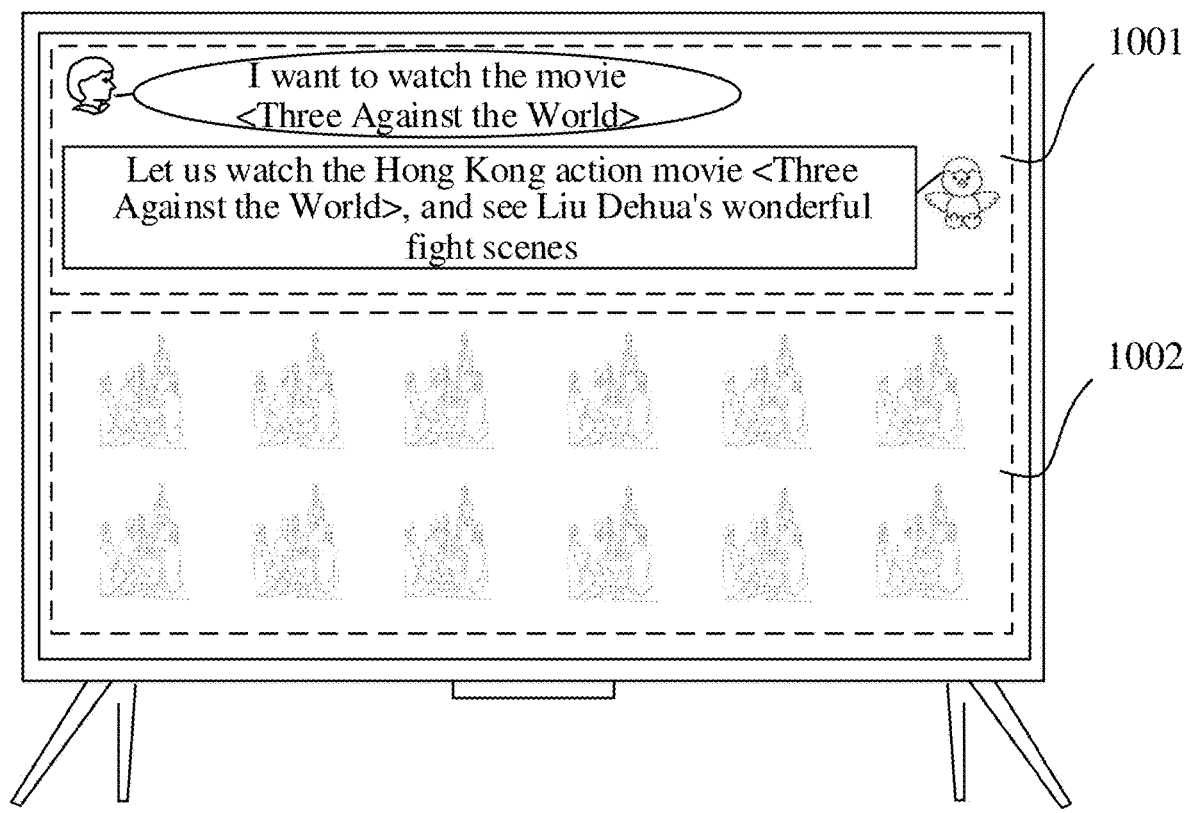
Figure 12B:
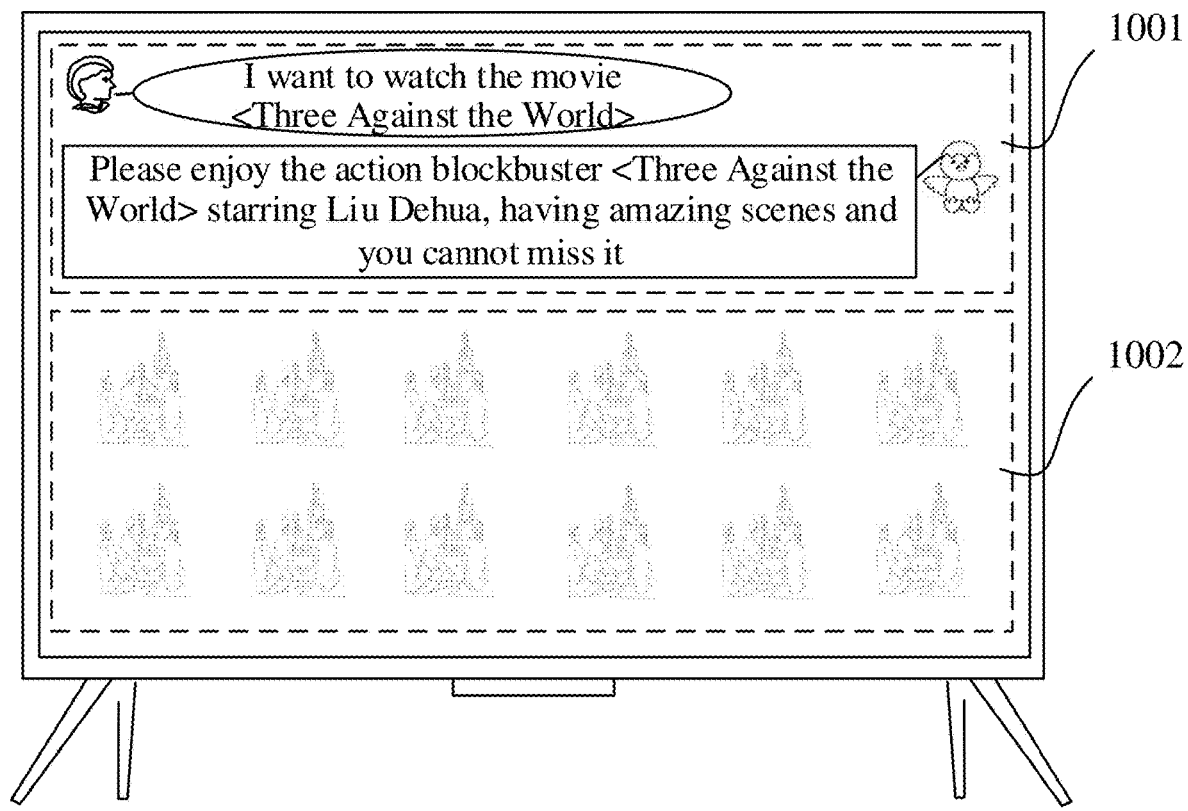

FIGS. 12A and 12B exemplarily show the user interface of the smart television in response to the user's query request for audio/video.

DETAILED DESCRIPTION

Example embodiments will now be described more fully with reference to the accompanying drawings.

At present, when a smart device responds to a user's query request, reply content is obtained based on the manually preset templates. This expression approach of replying with the manually preset templates is boring and not flexible enough, which cannot stimulate the user's interest for audio-visual content from the perspective of user experience.

The embodiments of the present disclosure provide an information exchange device and an information exchange method implemented based on the information exchange device, which can provide a reply matching the query result to the user when responding to the user's query request for audio/video in the human-machine interaction scenario, improving the user experience.

Exemplarily, the information exchange device in the embodiments of the present disclosure may be a display device with the voice interaction function, such as a smart television or a smart mobile terminal, etc., where the display device may respond to the user's query request for audio/video, display the resource information of the target audio/video on the display, and provide the reply text via voice. The information exchange device in the embodiments of the present disclosure may also be a playback device with the voice interaction function, such as a smart speaker, where the playback device can respond to the user's query request for audio and provide the reply text by voice.

In order to make the purposes and advantages of the exemplary embodiments of the present disclosure clearer, the exemplary embodiments of the present disclosure will be described clearly and completely below in combination with the accompanying drawings in the exemplary embodiments of the present disclosure. Obviously the described exemplary embodiments are a part of the embodiments of the present application but not all the embodiments.

Based upon the exemplary embodiments shown in the present disclosure, all of other embodiments obtained by those ordinary skilled in the art without creative work pertain to the protection scope of the present disclosure.

It should be understood that the terms "first", "second", "third" and the like in the specification and claims as well as the above drawings in the present disclosure are used to distinguish similar objects, but not necessarily to describe a particular order or sequence. It should be understood that the term used in this way is interchangeable under appropriate circumstances, for example, it can be implemented in an order other than those given in the illustration or description of the embodiments of the present disclosure.

In addition, the terms "include" and "have" and any variations thereof mean covering but non-exclusive inclusion, for example, a product or device that contains a series of components is not necessarily limited to those components listed clearly, but may include other components not listed clearly or inherent to the product or device.

The term "module" used in the present disclosure refers to any known or later developed hardware, software, firmware, artificial intelligence, fuzzy logic, or combination of hardware or/and software codes that can perform the function related to this element.

The term "remote controller" used in the present disclosure refers to a component of an electronic device (such as the display device disclosed in the present disclosure), which can generally control the electronic device wirelessly within a relatively short distance range. This component is generally be connected to the electronic device by using the infrared ray and/or Radio Frequency (RF) signal and/or Bluetooth, and may also include the WiFi, wireless USB, Bluetooth, motion sensor and other functional modules. For example, the handheld touch remote controller uses the user interface in the touch screen to replace most of the physical built-in hard keys in the general remote control device.

The term "gesture" used in the present disclosure refers to a user behavior for expressing the expected thought, action, purpose and/or result through the change in hand shape or the hand movement or other actions.

FIG. 1 exemplarily shows a schematic diagram of an operation scene between a display device and a control device according to an embodiment. As shown in FIG. 1, a user can operate the display device 200 through the mobile terminal 300 and the control device 100.

Here, the control device 100 may be a remote controller, which includes the infrared protocol communication or Bluetooth protocol communication and other short-range communication methods, etc., and controls the display device 200 wirelessly or by other wired methods. The user may input user instructions through the keys on the remote controller, voice inputs, control panel inputs, etc. to control the display device 200. For example, the user may input the corresponding control commands through the volume +/− keys, channel control keys, up/down/left/right directional keys, voice input keys, menu key, on/off key, etc. on the remote controller to control the functions of the display device 200.

In some embodiments, a mobile terminal, tablet computer, computer, laptop and other smart devices may also be used to control the display device 200. For example, an application running on the smart device is used to control the display device 200. This application may be configured to provide the user with various controls in an intuitive User Interface (UI) on the screen associated with the smart device.

Exemplarily, the mobile terminal 300 and the display device 200 may install software applications, and implement the connection and communication through the network communication protocols, achieving the purpose of one-to-one control operation and data communication. For example, it is possible to establish a control instruction protocol between the mobile terminal 300 and the display device 200, synchronize the remote control keyboard onto the mobile terminal 300, and realize the function of controlling the display device 200 by controlling the user interface on the mobile terminal 300. The audio/video content displayed on the mobile terminal 300 may also be transmitted to the display device 200 to realize the synchronous display function.

Still referring to FIG. 1, the display device 200 further performs the data communication with a server 400 through various communication methods. The display device 200 may be allowed to perform the communication and connection through a Local Area Network (LAN), a Wireless Local Area Network (WLAN), and other networks. The server 400 may provide various contents and interactions to the display device 200. Exemplarily, the display device 200 receives the software updates by sending and receiving the information and the Electronic Program Guide (EPG) interaction, or accesses a remotely stored digital media library. The server 400 may be one group or multiple groups, and may be one or more types of servers. The server 400 provides the video on demand, advertising service and other network service content.

The display device 200 may be a liquid crystal display, an OLED display, or a projection display device. The specific type, size, resolution, etc. of the display device are not limited, and those skilled in the art may understand that some changes may be made in the performance and configuration of the display device 200 as needed.

In addition to the broadcast receiving television function, the display device 200 may additionally provide the smart network television function that computer supports. Exemplarily, it includes: network television, smart television, Internet Protocol television (IPTV), etc.

FIG. 2 exemplarily shows a block diagram of the hardware configuration of the display device 200 according to an embodiment. As shown in FIG. 2, the display device 200 includes a controller 210, a modem 220, a communication interface 230, a detector 240, an input/output interface 250, a video processor 260-1, an audio processor 260-2, a display 280, an audio output 270, a memory 290, a power supply, and an infrared receiver.

The display 280 is used to receive the image signals input from the video processor 260-1, and display the video content and images as well as the menu control interface. The display 280 includes a screen component for presenting pictures and a drive component that drives the image display. The displayed video content may come from the broadcast television content, that is to say, various broadcast signals that can be received through the wired or wireless communication protocols. Or, various image contents sent from the network server side and received through the network communication protocols may be displayed.

Meanwhile, the display 280 also displays the user control interface (UI) generated in the display device 200 and used to control the display device 200.

And, depending on the type of display 280, it further includes a drive component for driving the display. Alternatively, if the display 280 is a projection display, it may further include a projection apparatus and a projection screen.

The communicator 230 is a component for communicating with an external device or an external server according to various types of communication protocols. For example: the communicator 230 may be a WiFi chip 231, a Bluetooth communication protocol chip 232, a wired Ethernet communication protocol chip 233, another network communication protocol chip or near-field communication protocol chip, and an infrared receiver (not shown in the figure).

The display device 200 may establish control signals and data signals connection with an external control device or content providing device through the communication interface 230. And, the infrared receiver is an interface unit that may be used to receive the infrared control signals of the control device 100 (for example, infrared remote controller, etc.).

The detector 240 is a component used by the display device 200 to collect the external environment or the interactive signals with the outside. The detector 240 includes a light receiver 242, which is a sensor for collecting the ambient light intensity, and may adaptively display the parameter changes and the like by collecting the ambient light.

And it includes an image collector 241, such as camera, webcam, etc., which may be used to collect the external environment scenes and to collect the user attributes or interact gestures with the user, may adaptively change the display parameters, and may also identify the user gestures to achieve the function of interaction with the user.

In some other exemplary embodiments, the detector 240 may also be a temperature sensor, etc. For example, by sensing the ambient temperature, the display device 200 may adaptively adjust the display color temperature of the image. For example, when the environment has a high temperature, the color temperature of the image displayed by the display device 200 may be adjusted to the cold color tone, or when the environment has a low temperature, the image displayed by the display device 200 may be adjusted to the warm color tone.

In some other exemplary embodiments, the detector 240 may also be a sound collector, etc., such as a microphone, which may be used to receive the user's voice, including a voice signal of the user's control instruction to control the display device 200, or collect the environmental sounds to identify the type of the environmental scene, and the display device 200 may adaptively adapt to the environmental noise.

The input/output interface 250 transmits the data between the display device 200 and other external devices under the control of the controller 210, for example, receives the video and audio signals or command instructions or other data from the external devices.

Here, the input/output interface 250 may include but is not limited to: any one or more of a High-Definition Multimedia Interface (HDMI) interface 251, an analog or data high-definition component input interface 253, a composite video input interface 252, a USB input interface 254, and an RGB terminal (not shown in the figure), etc.

In some other exemplary embodiments, the input/output interface 250 may also be a composite input/output interface formed of a plurality of interfaces described above.

The modem 220 receives the broadcast television signals in a wired or wireless manner, and may perform the amplification, frequency mixing, resonance and other modulation/demodulation processing, to demodulate out the television audio/video signals carried in the frequency of the television channel selected by the user from multiple wireless or wired broadcast television signals, as well as the EPG data signals.

The modem 220 may respond to the television signal frequency selected by the user and the television signal carried by the frequency according to the user's selection under the control of the controller 210.

According to different television signal broadcasting formats, the modem 220 may receive signals in many types of approaches, such as: terrestrial digital television, cable broadcasting, satellite broadcasting, or Internet broadcasting or the like; and according to different modulation types, the digital modulation mode or analog modulation mode may be possible. According to different types of received television signals, the analog signals and digital signals are possible.

In some other exemplary embodiments, the modem 220 may also be in an external device, such as an external set-top box. In this way, the set-top box outputs television audio/video signals after modulation and demodulation, which are input to the display device 200 through the input/output interface 250.

The video processor 260-1 is used to receive the video signal and perform the video processing such as decompression, decoding, scaling, noise reduction, frame rate conversion, resolution conversion, and image synthesis according to the standard codec protocol of the input signal, to obtain the signal that can be displayed or played directly on the display device 200.

Exemplarily, the video processor 260-1 includes a de-multiplexing module, a video decoding module, an image synthesis module, a frame rate conversion module, a display formatting module, etc.

Here, the de-multiplexing module is used to de-multiplex the input audio/video data stream, e.g., the input MPEG-2, and the de-multiplexing module de-multiplexes it into a video signal and an audio signal, etc.

The video decoding module is used to process the de-multiplexed video signal, including decoding and scaling, etc.

The image synthesis module, such as image synthesizer, is used to superimpose and mix the GUI signal generated by a graphics generator according to the user input or by itself with the scaled video image, to generate an image signal for display.

The frame rate conversion module is used to convert the frame rate of the input video, e.g., converting the frame rate of 60 Hz into the frame rate of 120 Hz or 240 Hz, where the usual format is implemented by interpolation, for example.

The display formatting module is used to change the received video output signal after the frame rate conversion to a signal conforming to the display format, e.g., output an RGB data signal.

The audio processor 260-2 is used to receive the external audio signal, and perform the processing such as decompression, decoding, noise reduction, digital-to-analog conversion and amplification according to the standard codec protocol of the input signal, to obtain the sound signal that can be played in the speaker.

In some other exemplary embodiments, the video processor 260-1 may include one or more chips. The audio processor 260-2 may also include one or more chips.

And, in some other exemplary embodiments, the video processor 260-1 and the audio processor 260-2 may be separate chips, or may be integrated into one or more chips together with the controller 210.

The audio output 270 is used to receive the sound signal output from the audio processor 260-2 under the control of controller 210, such as: a speaker 272; and may include an external audio output terminal 274 outputting to a generator of an external device, such as:

external audio interface or headphone interface, in addition to the speaker 272 in the display device 200 itself.

The power supply provides the power supply support for the display device 200 through the power input from an external power supply under the control of the controller 210. The power supply may include a built-in power supply circuit installed inside the display device 200, or may be a power supply installed outside the display device 200, and a power interface of the external power supply is provided in the display device 200.

The user input interface is used to receive user input signals, and then send the received user input signals to the controller 210. The user input signals may be remote controller signals received through the infrared receiver, and various user control signals may be received through the network communication module.

Exemplarily, the user inputs a user command through the remote controller 100 or the mobile terminal 300, the user input interface is based on the user's input, and the display device 200 responds to the user's input through the controller 210.

In some embodiments, the user may input a user command on the Graphical User Interface (GUI) displayed on the display 280, and the user input interface receives the user input command through the Graphical User Interface (GUI). Alternatively, the user may input a user command by inputting a particular sound or gesture, and the user input interface recognizes the sound or gesture through the sensor to receive the user input command.

The controller 210 controls the operations of the display device 200 and responds to the user's operations through various softwares stored in the memory 290.

As shown in FIG. 2, the controller 210 includes an RAM 213, an ROM 214, a graphics processor 216, a CPU processor 212, communication interfaces 218, such as: a first interface 218-1 to an n-th interface 218-*n*, and a communication bus, wherein the RAM 213, ROM 214, graphics processor 216, CPU processor 212, and communication interfaces 218 are connected through the bus.

The ROM 213 is used to store various system startup instructions. For example, when receiving a power-on signal, the power supply of the display device 200 starts up, and the CPU processor 212 runs the system startup instructions in the ROM and copies the operating system stored in the memory 290 into the RAM 213 to start to run and initiate the operating system. When the startup of the operating system is completed, the CPU processor 212 then copies various applications in the memory 290 into the RAM 213, and then starts to run and initiate various applications.

The graphics processor 216 is used to generate various graphics objects, such as icons, operation menus, display graphics of user input instructions, etc. It includes an arithmetic unit, which performs the operations by receiving various interactive instructions input by users, and displays various objects according to the display attributes. And it includes a renderer, which generates the result of rendering various objects obtained based on the arithmetic unit, for displaying on the display 280.

The CPU processor 212 is used to execute the operating system and application instructions stored in the memory 290, and execute various applications, data and content according to various interactive instructions received from the outside so as to finally display and play various audio/video contents.

In some exemplary embodiments, the CPU processor 212 may include multiple processors. The multiple processors may include a main processor and one or more sub-processors. The main processor is used to perform some operations of the display device 200 in the pre-power-up mode, and/or the operations of the display picture in the normal mode. One or more sub-processors are used to perform an operation in the standby mode or other states.

The controller 210 may control the overall operation of the display device 200. For example, in response to receiving a user command for selecting a UI object displayed on the display 280, the controller 210 may perform the operations related to the object selected by the user command.

Here, the object may be any one of selectable objects, e.g., hyperlink or icon. The operations related to the selected object include, for example, the operation of displaying the connection to the hyperlink page, document, image or the like, or the operation of executing the application corresponding to the icon. The user command for selecting the UI object may be a command input through various input devices (for example, mouse, keyboard, touch pad, etc.) connected to the display device 200 or a voice command corresponding to the voice spoken by the user.

The memory 290 includes various software modules for driving the display device 200. For example, various software modules stored in the memory 290 include: a basic module, a detection module, a communication module, a display control module, a browser module, and various service modules, etc.

Here, the basic module is an underlying software module for the signal communications among various hardwares in the display device 200 and sending the processing and control signals to the upper modules. The detection module is a management module for collecting various information from various sensors or user input interfaces and performing digital-to-analog conversion and analysis management.

For example, the voice recognition module includes a voice parsing module and a voice instruction database module. The display control module is a module for controlling the display 280 to display the image content, and can be used to play the information such as multimedia image content and UI interface. The communication module is a module for performing the control and data communications with external devices. The browser module is a module for performing the data communications among browsing servers. The service module is a module for providing various services and various application programs.

Meanwhile, the memory 290 is further used to store the received external data and user data, images of various items in various user interfaces, and visual effect of focus objects, etc.

FIG. 3 exemplarily shows a configuration block diagram of the control device 100 according to an exemplary embodiment. As shown in FIG. 3, the control device 100 includes a controller 110, a communication interface 130, a user input/output interface 140, a memory 190, and a power supply 180.

The control device 100 is configured to control the display device 200, receive the input operation instructions of the user, and convert the operation instructions into instructions that can be recognized and responded by the display device 200, playing an intermediary role between the user and the display device 200. For example, the user operates the channel +/− keys on the control device 100, and the display device 200 responds to the channel +/− operations.

In some embodiments, the control device 100 may be a smart device. For example, the control device 100 may install various applications for controlling the display device 200 according to the user requirement.

In some embodiments, as shown in FIG. 1, the mobile terminal 300 or another smart electronic device may perform the function similar to the control device 100 after installing an application that manipulates the display device 200. For example, the user may provide various function keys or virtual buttons of the graphical user interface on the mobile terminal 300 or another smart electronic device by installing applications, to realize the functions of the physical keys of the control device 100.

The controller 110 includes a processor 112, an RAM 113, a ROM 114, a communication interface 218, and a communication bus. The controller 110 is used to control the running and operations of the control device 100, and the communication cooperation among internal components as well as the external and internal data processing functions.

The communication interface 130 realizes the communications of control signals and data signals with the display device 200 under the control of the controller 110. For example, the received user input signal is sent to the display device 200. The communication interface 130 may include at least one of a WiFi chip, a Bluetooth module, an NFC module and other near field communication modules.

In the user input/output interface 140, the input interface includes at least one of a microphone 141, a touch panel 142, a sensor 143, a key 144 and other input interfaces. For example, the user may realize the user instruction input function through voice, touch, gesture, press and other actions, and the input interface converts the received analog signal to a digital signal, converts the digital signal to a corresponding command signal, and sends it to the display device 200.

The output interface includes an interface sending the received user instruction to the display device 200. In some embodiments, it may be an infrared interface or a radio frequency interface. For example, in the case of infrared signal interface, it need to convert the user input instruction into an infrared control signal according to the infrared control protocol and send it to the display device 200 via the infrared sending module. As another example, in the case of radio frequency signal interface, it need to convert the user input instruction into a digital signal, modulate it according to the radio frequency control signal modulation protocol, and then send the modulated signal to the display device 200 via the radio frequency sending terminal.

In some embodiments, the control device 100 includes at least one of the communication interface 130 and the output interface. The communication interface 130 is configured in the control device 100, such as WiFi, Bluetooth, NFC or another module, which can encode the user input instruction through the WiFi protocol or Bluetooth protocol or NFC protocol, and then send it to the display device 200.

The memory 190 is used to store various operating programs, data, and applications that drive and control the control device 100 under the control of the controller 110. The memory 190 may store various kinds of control signal instructions input from the user.

The power supply 180 is used to provide operating power support for all the elements of the control device 100 under the control of the controller 110. It may be a battery and a related control circuit.

FIG. 4 exemplarily shows a schematic diagram of the functional configuration of the display device 200 according to an exemplary embodiment. As shown in FIG. 4, the memory 290 is used to store the operating system, applications, content, user data, and the like, and drive the system of the display device 200 to run and respond to various operations of the user under the control of the controller 210. The memory 290 may include a volatile and/or non-volatile memory.

The memory 290 is specifically used to store the programs that drive the controller 210 in the display device 200 to run, and stores various applications built in the display device 200, various applications downloaded by the user from external devices, various graphical user interfaces related to the applications, various objects related to the graphical user interfaces, user data information, and various internal data supporting the applications. The memory 290 is used to store the OS kernel, middleware, applications and other system softwares, and store the input video data and audio data and other user data.

The memory 290 is specifically used to store the drive programs and related data of the video processor 260-1, the audio processor 260-2, the display 280, the communication interface 230, the modem 220, the detector 240, the input/output interface and the like.

In some embodiments, the memory 290 may store the softwares and/or programs, where the software programs used to represent the Operating System (OS) include, for example, kernel, middleware, Application Programming Interface (API), and/or application programs. Exemplarily, the kernel may control or manage the system resources or the functions implemented by other programs (such as the middleware, API or application programs), and the kernel may provide interfaces to allow the middleware and API or applications to access the controller, to control or manage the system resources.

Exemplarily, the memory 290 includes a broadcast receiving module 2901, a channel control module 2902, a volume control module 2903, an image control module 2904, a display control module 2905, an audio control module 2906, an external instruction recognition module 2907, a communication control module 2908, a light receiving module 2909, a power control module 2910, an operating system 2911, and other applications 2912, a browser module, etc. The controller 210 executes various softwares in the memory 290 to perform, for example, the broadcast television signal reception and demodulation function, television channel selection control function, volume selection control function, image control function, display control function, audio control function, external instruction recognition function, communication control function, optical signal receiving function, power control function, software control platform supporting various functions, browser function, and other applications.

FIG. 5A exemplarily shows a configuration block diagram of a software system in the display device 200 according to an exemplary embodiment.

As shown in FIG. 5A, the operating system 2911 includes operating software for processing various basic system services and perform hardware-related tasks, and serves as a medium completing the data processing between applications and hardware components. In some embodiments, part of the kernel of the operating systems includes a series of software for managing hardware resources of the display device, and providing service to other applications or software codes.

In other some embodiments, part of kernel of the operating system includes one or more device drivers, which may be a set of software codes in the operating system and help to operate or control the devices or hardware associated with the display device. The drive may contain the codes for operations on the video, audio and/or other multimedia components. Exemplarily, the display screen, camera, Flash, WiFi and audio driver are included.

Here, an access module 2911-1 is configured to modify or access an application to realize the access of the application and the operations of the display content thereof.

A communication module 2911-2 is configured to connect with other peripheral devices via the related communication interfaces and communication networks.

A user interface module 2911-3 is configured to provide objects on the user interface, to allow access of various applications and operations of the user.

A control application 2911-4 is configured to manage the controllable processes, including the runtime application, etc.

The event dispatch system 2914 may be implemented in the operating system 2911 or the application 2912. In some embodiments, on the one hand, it is implemented in the operating system 2911, and simultaneously implemented in the application 2912. It is a processing program configured to monitor various user input events and designate the recognition results in response to various types of events or sub-events according to various events to implement one or more sets of predefined operations.

Here, an event listening module 2914-1 is configured to monitor the events or sub-events input via the user input interface.

The event recognition module 2914-2 is configured to recognize various events or sub-events according to the definitions of various events input through various user input interfaces, and dispatch the events or sub-events to a processor to execute the corresponding one or more sets of processing programs.

Here, the events or sub-events refer to the inputs detected by one or more sensors in the display device 200 and the inputs of the external control device (such as the control device 100, etc.), such as: various sub-events input by voice, gesture inputs recognized by gesture, and sub-events input by the remote control key instructions of the control device, etc. Exemplarily, one or more sub-events in the remote controller include multiple forms, including but not limited to one or a combination of pressing up/down/left/right keys, OK key, pressing and holding the key and the like, as well as the operations of non-physical keys, such as moving, pressing, releasing, etc.

The interface layout management module 2913 is configured to directly or indirectly receive various user input events or sub-events monitored by the event dispatch system 2914, to update the layout of a user interface. The update includes but not limited to updating positions of respective controls or child controls on the interface, size or position of a container, and hierarchy, and various other operations related to interface layout.

As shown in FIG. 5B, the application layer 2912 contains various applications that can also be executed on the display device 200. The applications may include but not limited to one or more applications, such as: live television application, video-on-demand application, media center application, application center, game application, etc.

The live television application can provide live television through different signal sources. For example, the live television application can provide television signals using input from cable television, radio broadcast, satellite service or other types of live television services. In addition, the live television application can display videos of live television signals on the display device 200.

The video on demand application can provide videos from different storage sources. Different from the live television application, the video on demand provides video display from some storage sources. For example, the video on demand can come from a server side of cloud storage, and a local hard disk storage containing stored video programs.

The media center application is an application which can play various multimedia contents. For example, the media center is different from live television or video on demand, and the user is able to access various images or services provided by audios through the media center application.

The application center may store various applications. The application may be a game application or some other applications that are related to the computer system or other devices but capable of running in the display device. The application center can acquire these applications from different sources, and store them in the local memory, and then the applications can run on the display device 200.

FIG. 6 exemplarily shows a schematic diagram of the user interface in the display device 200 according to an exemplary embodiment. As shown in FIG. 6, the user interface includes a plurality of view display areas, for example, a first view display area 201 and a second view display area 202, where each view display area includes one or more different layout items. And the user interface further includes a selector for indicating the items being selected, and the position of the selector can be moved through user input, to select different items by changing the positions.

It should be noted that the plurality of view display areas may have visible boundaries or invisible boundaries. For example, different view display areas may be identified by different background colors of individual view display area or may be visually identified by boundary lines or the like, or there may be invisible boundaries that cannot be seen. Or there may be no visible or invisible boundaries, but only the related items (where the attributes, such as the sizes and/or arrangements, change accordingly) in the area with a certain range are displayed on the screen, where the area with the certain range is regarded as the existence of the boundary of the view partition, for example, the items in the view display area 201 are simultaneously reduced or enlarged, but the changes in the view display area 202 are different.

In some embodiments, the first view display area 201 is the scalable view display. The "scalable" may mean that the size or proportion of the first view display area 201 on the screen is scalable, or the size or proportion of the item in the first view display 201 on the screen is scalable. The first view display area 201 is a scroll view display area, which can perform the rolling update on the number of items displayed on the screen through the user input.

The "item" refers to a visual object displayed in each view display area of the user interface in the display device 200 to represent the corresponding content such as icon, thumbnail, video clip, etc. For example, the item may represent the image content or video clip of a movie or teleplay, the audio content of music, an application, or other history information of the user access content.

In some embodiments, the "item" may display an image thumbnail. For example, when the item is a movie or teleplay, the item may be displayed as the poster of the movie or teleplay. When the item is music, the poster of the music album may be displayed. When the item is an application, it may be displayed as the icon of the application, or when the application is executed recently, a content screenshot of the application may be captured. When the item is the user access history, it may be displayed as a content screenshot in the most recent execution process. The "item" may be displayed as a video clip. For example: the item is dynamic pictures from the video clip of the trailer of a movie or teleplay.

Furthermore, the item may represent the display of an interface or a set of interfaces of the display device 200 connected to an external device, or may represent the name of an external device connected to the display device, and so on, such as: a set of signal source input interfaces, or HDMI interface, USB interface, PC terminal interface, etc.

In a smart television according to some embodiments of the present-disclosure, the controller may be configured to: send a query command comprising a keyword to a server in response to a query request for audio/video from a user input interface, receive the media resource information and a reply text sent from the server, and control the display to present the media resource information (the media resource information such as URL) in the first area on the user interface and present the reply text in the second area on the user interface. For example, the reply text is displayed in the view display area 201 in the interface shown in FIG. 6, and the media resource information is displayed in the view display area 202. Here, the server is configured to determine the media resource information of the corresponding target audio/video according to the keyword in response to receiving the query command, and generate the reply text according to the keyword, and the server is configured to generate the reply texts with random contents in response to at least two query requests for the same audio/video. The smart television may perform the corresponding method according to the above configuration.

Here, at least two query requests for the same audio/video refer to querying the same target audio/video, and the text contents of the at least two query requests may be identical or not identical. The server is configured to generate the reply texts with random contents in response to two consecutive query requests for the same audio/video, which means that the contents of the reply texts corresponding to at least two query requests are different, or there is a certain probability that the contents of the reply texts corresponding to at least two query requests for the same audio/video are different.

For example, for two consecutive queries for the same audio/video, the contents of the obtained reply texts are random, that is to say, the contents of two obtained reply texts may not be exactly same, where the difference may be reflected in at least one of the following aspects: the expression approach (such as declarative sentence, rhetorical question, etc.), the order of words in the reply text, the number of words contained in the reply text (the length of the reply text), the modal particles or sentiment words contained in the reply text, etc.

In some embodiments, the generating the reply text according to the keyword may include: obtaining the attribute information corresponding to the keyword according to the keyword in response to receiving the query command, and generating the reply text according to a preset template selected randomly from a plurality of preset templates and the attribute information; or obtaining the attribute information corresponding to the keyword according to the keyword in response to receiving the query command, and selecting one of multiple candidate reply texts generated according to the attribute information as the reply text sent to the display.

In a smart television according to some other embodiments of the present disclosure, the controller may be configured to: send a query command comprising a keyword to a server in response to a query request for audio/video from a user input interface, receive the media resource information and a reply text sent from the server, and control the display to present the media resource information in the first area on the user interface and present the reply text in the second area on the user interface. For example, the reply text is displayed in the view display area 201 in the interface shown in FIG. 6, and the media resource information is displayed in the view display area 202, wherein the server is configured to determine the media resource information of the corresponding target audio/video according to the keyword in response to receiving the query command, and the server is further configured to obtain the attribute information corresponding to the keyword according to the keyword in response to receiving the query command, and generate the reply text according to a preset template selected randomly from a plurality of preset templates and the attribute information, where the reply text is configured to have the random content in response to two consecutive query requests for the same audio/video. The smart television may perform the corresponding method according to the above configuration.

In some embodiments, the above-mentioned controller in the smart television may further control the speaker of the smart television to output an audio corresponding to the reply text after receiving the media resource information and the reply text sent from the server.

In a smart television according to other some embodiments of the present disclosure, the controller may be configured to: send a query command comprising a keyword to a server in response to a query request for audio/video from a user input interface, receive the media resource information and a reply text sent from the server, and control the display to present the media resource information in the first area on the user interface and present the reply text in the second area on the user interface. For example, the reply text is displayed in the view display area 201 in the interface shown in FIG. 6, and the media resource information is displayed in the view display area 202, wherein the server is configured to determine the media resource information of the corresponding target audio/video according to the keyword in response to receiving the query command, and the server is further configured to obtain the attribute information corresponding to the keyword according to the keyword in response to receiving the query command, and generate the reply text according to a preset template selected randomly from a plurality of preset templates and the attribute information, where the reply text is configured to have different contents for two consecutive query requests for the same audio/video. The smart television may perform the corresponding method according to the above configuration.

In a smart television according to other some embodiments of the present disclosure, the controller may be configured to: send a query command comprising a keyword to a server in response to a query request for audio/video from a user input interface, receive the media resource information and a reply text sent from the server, and control the display to present the media resource information in the first area on the user interface and present the reply text in the second area on the user interface. For example, the reply text is displayed in the view display area 201 in the interface shown in FIG. 6, and the media resource information is displayed in the view display area 202, wherein the server is configured to determine media resource information of corresponding target audio/video according to the keyword in response to receiving the query command, and the server is further configured to obtain attribute information corresponding to the keyword according to the keyword in response to receiving the query command, and select one of multiple candidate reply texts generated according to the attribute information as a reply text sent to the smart television, where the reply text is configured to have the random content in response to two consecutive query requests for a same audio/video. The smart television may perform the corresponding method according to the above configuration.

The server according to the embodiments of the present disclosure may interact with the above smart television, so as to provide the smart television with the reply text according to the query command of the smart television. In some embodiments, the server may be configured to perform the operations of: receiving a query command containing a keyword sent by the smart television, determining the media resource information of the corresponding target audio/video according to the keyword in response to receiving the query command, generate a reply text according to the keyword, and send the media resource information and the reply text to the smart television, so that the smart television presents the media resource information in the first area on the user interface and presents the reply text in the second area on the user interface, wherein the reply text is configured to have the random content for two consecutive query requests for a same audio/video.

In order to enable the content of the reply text obtained for two consecutive query requests to have the certain randomness, the server may perform one of the following operations.

Operation 1: obtaining the attribute information corresponding to the keyword according to the keyword in response to receiving the query command, and generating a reply text according to a preset template selected randomly from a plurality of preset templates and the attribute information.

Specifically, the attribute information may be input into a preset model (hereinafter referred to as reply text generation model) to generate the reply text, where the preset model is configured to include a plurality of preset templates, and the reply text is generated according to a preset template selected from the plurality of preset templates and the input attribute information.

Operation 2: obtaining the attribute information corresponding to the keyword according to the keyword in response to receiving the query command, and selecting one of multiple candidate reply texts generated according to the attribute information as the reply text sent to the display.

Specifically, the attribute information may be input into a preset model (i.e., reply text generation model) configured to generate multiple candidate reply texts according to the input attribute information and preset multiple templates, and one of the generated multiple candidate reply texts is selected as the reply text.

According to the above embodiments of the present disclosure, the server may generate the reply text based on the reply text generation model by using the attribute information of the target audio/video, wherein the reply text generation model generates reply texts based on the reply text generation templates obtained by training. This will be described in detail below.

In an embodiment of the present disclosure, the server may use the trained reply text generation model and use the queried attribute information of the target audio/video as the input of this model, and the output of this model is the reply texts.

Here, the attribute information of the audio/video may include one or any combination of audio/video name, actor name, director name, release time, region, genre, character name, plot information, comment information, classic line, theme song name.

The above attribute information of the audio/video can be divided into the inherent attribute information and auxiliary information.

The inherent attribute information may also be called basic information, which is used to describe the basic attributes of the audio/video and is objective information. By taking a movie as an example, the inherent attribute information of a movie may include the movie title, cast, director, genre (such as drama, romance or disaster), region, release time, etc. of the movie. By taking a music work as an example, the inherent attribute information of a music work may include the music name, lyricist, composer, release time, music style, theme, etc. of the music work.

By taking a drama as an example, its attribute information (inherent attribute information) may further include one or any combination of:
  plot keywords, which can be extracted from the plot synopsis by using a keyword extraction algorithm (for example, TF-IDF algorithm);
  classic lines;
  theme song information, such as theme song name;
  character's name.

The inherent attribute information of the audio/video may be obtained in various ways. By taking a drama as an example, for example, the inherent attribute information may be obtained from the drama database or the knowledge base related to the drama.

Still by taking a drama as an example, for a drama that will be released soon or has been just released, there may be no data related to this drama in the drama database or the knowledge base related to the drama. In some embodiments of the present disclosure, for such a drama, the relevant information of the drama may be obtained from the forecast information (including a trailer), the promotional information (including a promotional video, the information in online media promotion) or the release information (such as the release information published at a press conference) or other approaches or sources, to establish the structured data of the drama, wherein the information related to the drama obtained from the above approaches or sources may specifically include: tile, cast, director, genre, region, release time, etc., and may further include the following information of the drama: character name, plot keyword, sentiment word, classic lines, theme song name, etc.

The attribute information of the audio/video may further include auxiliary information. In some embodiments, the auxiliary information of the audio/video includes the comment information of the audio/video. In some embodiments, the comment information of the audio/video may include sentiment words, and may further include tone enhancement words, wherein the sentiment words include words or phrases for describing the user's subjective feeling and evaluation of the audio/video, such as "like", "shock", "classic", "moving", etc. The tone enhancement words include words or phrases for describing the degree of the user's subjective feeling of the audio/video, such as "most", "still", "lose self-control", etc.

The comment information of the audio/video can come from the introduction, evaluation, impression of view or the like for the audio/video work on the Internet. For example, the film review for a film work may be obtained from the Internet, the word segmentation is performed on the film review, the adjectives, tone enhancement words and others that describe the user's feelings are extracted as the auxiliary information of the film work, and the auxiliary information is added into the attribute information of the film work.

In some embodiments, the comment information (such as sentiment words) may be extracted from the following aspects:
  plot: for example, "stimulation", "fantastic plot", "delicate plot", "true", etc.;
  emotion: for example, "tears in laughter", "rich emotion", "fine emotion", "warm and moving", etc.;
  acting skill: for example, "the actor has good acting skills", "the actor has excellent acting skills", "the performance is very delicate", "acting skills are online", etc.;
  visual experience: for example, "exquisite", "exquisite and generous", "beautiful", "delicate", etc.;

rhythm: for example, "progressive rhythm", "compact rhythm", "fluent and compact rhythm", "compact and full", etc.;

special effect: for example, "special effects are amazing", "special effects are very cool", "special effects are great", "special effects are excellent", etc.;

character: for example, "character portrayal is excellent", "character personality is distinctive", "character is very distinctive", "character is very attractive", etc.;

background music: for example, "song is nice", "background music is pleasant to listen", "cozy background music", "nice and serve as a foil to scene", etc.

How to extract the comment information from user review will be illustrated below in several examples.

Example 1: the user review for the film A include: "average people performance and ingenious structure, harmony between simplicity and dazzling skills", "it is very good-looking", "it is produced quite well". The "ingenious", "simplicity", "harmony", "good-looking" and "well" may be extracted from these reviews as the sentiment words of this film, and "very" and "quite" are extracted as the tone enhancement words.

Example 2: the user review for the film B include: "revisit the story of Xiaogang's family and gorilla, cozy broken caves and super warm dadaji", "from the perspective of animal rights, it is advocated that the strict vegetarian diet includes nonuse of animal products and clothing and the like, the content is really too thrilling". The "cozy", "warm" and "thrilling" may be extracted from the user review as the sentiment words of this film, and "super", "really" and "too" are extracted as the tone enhancement words.

The attribute information of the audio/video in the embodiments of the present disclosure may be stored as the structured data. Table 1 exemplarily shows the structured data of a film work in an embodiment of the present disclosure.

TABLE 1

| structured data of film work (attribute information of audio/video) | |
|---|---|
| Information field name | Information field content |
| Title | Titanic |
| Top cast | Leonardo DiCaprio |
| Top cast | Kate Winslet |
| Director | James Cameron |
| region | America |
| release time | 1997 |
| Genre | Drama |
| Genre | Love |
| Genre | Disaster |
| Role | Jack |
| Role | Rose |
| Plot keyword | Passenger ship |
| Plot keyword | Fall in love |
| Plot keyword | Iceberg |
| Plot keyword | Destiny |
| Plot keyword | Sunken ship |
| Sentiment word | Like |
| Sentiment word | Not one of the |
| Sentiment word | Profound |
| Sentiment word | Shock |
| Sentiment word | Classic |
| Sentiment word | Moving |
| Tone enhancement word | Most |
| Tone enhancement word | Still |
| Tone enhancement word | Cannot help. |

TABLE 1-continued

| structured data of film work (attribute information of audio/video) | |
|---|---|
| Information field name | Information field content |
| Classic line | Promise me you'll survive. That you won't give up, no matter what happens. No matter how hopeless. |
| Theme song name | My heart will go on |
| . . . | . . . |

Based on the above structured data (attribute information) of the audio/video, in the embodiments of the present disclosure, when the model for generating the reply text is trained and when the model is used to generate reply texts according to the query command, the structured data of the audio/video containing the above content is used, so that the template obtained by training according to the model may contain more information, and then the content of the reply text generated based on the template is diversified, thereby increasing the appeal to users.

For example, the sentiment words extracted from the user review of the film work are added to the structured data of the audio/video, which can make the content of the generated reply text more diversified; the tone enhancement words are added to the structured data of the audio/video, which can make the content of the generated reply text more emotional; the classic lines are added to the structured data of the audio/video, which can enable the generated reply text to resonate with users and thus attract users to watch; and the theme song name is added to the structured data of the audio/video, which can enable the generated reply text to express the essence of the film and then attract users to watch.

In some embodiments, in an embodiment of the present disclosure, an index may be established for the structured data (attribute information) of each audio/video, such as ElasticSearch index (ElasticSearch is a distributed, highly scalable, and highly real-time search and data analysis engine), so that after the query command including the keyword is received, the structured data (attribute information) of the target audio/video is searched quickly through the index according to the keyword.

In embodiments of the present disclosure, the template for generating the reply text can be obtained through model training. When the server receives a query command containing a keyword, the attribute information of the target audio/video requested by the user is used as the input of the model, so that the model generates the reply text according to the reply template obtained by pre-training.

In an embodiment of the present disclosure, when the samples for model training are set, considering that the resulting reply text should be flexible, for the same input (the structured data of the same audio/video), the reply text generated each time may need to contain the content of some information fields in the structured data of the audio/video. In order to construct a training sample set, for the structured data of each audio/video, the manual annotation method may be used to obtain multiple corresponding and different reply texts as the training samples. The sentence patterns of each reply text as the training sample may be as rich and varied as possible, for example, it can be a question, such as "do you want to know why Baymax is created (Baymax is a virtual character in the "Big Hero 6")? You are invited to watch the movie "Big Hero 6"". Each reply text as the training sample may contain the content of some information fields in the structured data of the corresponding audio/video.

Alternatively, in the case of using the manual annotation method to obtain the reply texts as the training samples, the de-semantic preprocessing may be applied to the reply texts as the training samples. The structured audio/video attribute information, as shown in Table 1, may include multiple information fields, where each information field (field) has a unique identifier or serial number, such as: "actor_1: Leonardo DiCaprio, actor_2: Kate Winslet". The de-semantic processing refers to replacing some segments (such as the segments where the title of the audio/video, person name, character name, etc.) in the reply text with the identifier (such as field number) of the corresponding information field name in the structured data of the audio/video. The de-semantic preprocessing may reduce the size of the vocabulary and improve the generalization ability of the model so that it can process most movie titles, person names, character names and dates, but not just particular movie names, person names, character names and dates.

For example, the manually annotated reply text as the training sample is: "Myth" is a love movie starring Jackie Chan and Jin Xishan, which was released in 2005. Please enjoy it". This reply text may be replaced with: ""work title_1" is a love movie starring actor_1 and actor_2, which was released in 2005. Please enjoy it", wherein "work name_1" represents the field number of the field where the film title is located in the structured data of the movie, "actor_1" represents the field number of the field where the name of the actor Jackie Chan is located in the structured data of the movie, and "actor_2" represents the field number of the field where the name of the actress Jin Xishan is located in the structured data of the movie.

As another example, the structured data of a given audio/video is:

[film title_1: Titanic, actor_1: Leonardo DiCaprio, actor_2: Kate Winslet, director_1: James Cameron, release time_1: 1997, genre_1: love].

Corresponding to the structured data, the manually annotated natural sentence as the reply text is:

"Titanic" is an affection film directed by James Cameron and starring Leonardo DiCaprio and Kate Winslet, which was released in 1997.

Through the de-semantic preprocessing, the "Titanic", "Leonardo DiCaprio", "Kate Winslet", "James Cameron" and "1997" in the above sentence are replaced with the identifiers of the corresponding information field names in the structured attribute information of the film: "film title_1", "actor 1", "actor 2", "director_1" and "release time_1".

In an embodiment of the present disclosure, a reply text generation model may be established, and the model is trained based on the training samples to obtain the reply text template, and then the structured data (attribute information) of the audio/video requested by the user may be input into the model, so that the model generates the corresponding reply text according to the reply text template obtained by training.

In the embodiments of the present disclosure, since the reply text is generated in accordance with the reply text template, the generated reply text may be controllable and interpretable, wherein the reply text template may be obtained by training based on the mixed attention mechanism based on the combination of chain and content, so as to ensure that the statement of the reply text generated based on the template has the sequential logic and the sentences are more fluent and coherent.

In an embodiment of the present disclosure, the reply text generation model may use the Hidden Semi-Markov Model (HSMM) suitable for segment modeling, and use a neural network to define the emission distribution. The hidden semi-Markov model is a statistical model, which is used to describe a Markov process containing the hidden and unknown parameters.

Here, the neural network in the hidden semi-Markov model uses the LSTM (Long short-term memory), wherein the LSTM uses the mixed attention mechanism based on the combination of chain and content. By taking a movie as an example, when describing a movie, the title is generally mentioned at first, then its cast, and then the genre. The description of these information fields generally conform to a sequential relationship. In order to enable the content described when the reply text is generated to have the sequential logic, the chain-based attention mechanism may be used when the general content-based attention mechanism is used.

In some embodiments, FIG. 7 shows a partial schematic diagram of a text generation model combining a neural network with templates in an embodiment of the present disclosure, and specifically shows the neural network part of the model combining the neural network with templates. As shown in the figure: for a candidate word, the LSTM score (for the classified input of the softmax layer) is added to the copy score of the candidate word calculated based on the copy mechanism, and the addition result is further normalized to obtain the comprehensive probability distribution of the candidate word, and the output y (word) is obtained according to the probability distribution of the candidate word.

This will be illustrated below in details with reference to FIG. 7.

(1) Calculate the Attention Vector.

FIG. 8 exemplarily shows a schematic diagram of the mixed attention mechanism in an embodiment of the present disclosure. As shown in the figure, $C_i$ is the field value insertion, $f_i$ is the field name insertion (that is, $C_i$ is the content of the information field in the structured data of the audio/video as input, and $f_i$ is the information field name in the structured data of the audio/video as input), and the input of the LSTM is the joint $xi=[f_i; C_i]$ of the field name and field value. The method of calculating the mixed attention is as follows.

(i) Define the chain matrix $\mathcal{L} \in R^{n_f \times n_f}$ according to the structure (information field) of the structured data of the audio/video to model the probability that one information field appears before another. Every element $\mathcal{L}[f_j, f_i]$ in this chain matrix is the probability fraction moving from $f_i$ to $f_j$, wherein $f_i$ is the $i^{th}$ information field name, and $\mathcal{L}[f_j, f_i]$ represents the probability that the $i^{th}$ information field $f_i$ is firstly mentioned and then the $j^{th}$ information field $f_j$.

(ii) Calculate the chain-based attention according to the previous mixed attention and the defined chain matrix. The chain-based attention can make the statement more logical when the sentences are generated.

The formula of calculating the chain-based attention is:

$$\alpha_{t,i}^{link} = \text{softmax}\left\{\sum_{j=1}^{C} \alpha_{t-1,j} \cdot \mathcal{L}[f_j, f_i]\right\} \quad [1]$$

$$= \frac{\exp\left\{\sum_{j=1}^{C} \alpha_{t-1,j} \cdot \mathcal{L}[f_j, f_i]\right\}}{\sum_{i=1}^{C} \exp\left\{\sum_{j} \alpha_{t-1,j} \cdot \mathcal{L}[f_j, f_i]\right\}}$$

wherein $\mathcal{L}$ is a part of the model parameters, which is learned through back propagation. $\Sigma_{j=1}^{C}\alpha_{t-1,j}\cdot\mathcal{L}[f_j, f_i]$ is similar to the transition matrix in one step of the Markov chain.

(iii) Calculate the content-based attention according to the value (content) of each information field in the structured data of the audio/video. The content-based attention makes the field value of the same information field more reasonable and smooth when it is generated.

The formula of calculating the content-based attention is:

$$\tilde{\alpha}_{t,i}^{(f)} = f_i^T\left(W^{(f)}y_{t-1} + b^{(f)}\right)$$

$$\tilde{\alpha}_{t,i}^{(c)} = h_i^T\left(W^{(c)}y_{t-1} + b^{(c)}\right)$$

$$\alpha_{t,i}^{content} = \frac{\exp\{\tilde{\alpha}_{t,i}^{(f)}\tilde{\alpha}_{t,i}^{(c)}\}}{\sum_{j=1}^{C}\exp\{\tilde{\alpha}_{t,j}^{(f)}\tilde{\alpha}_{t,j}^{(c)}\}}$$

[2]

(iv) Perform the weighted summation on the chain-based attention and content-based attention to obtain the mixed attention.

The formula of calculating the mixed attention is:

$$\alpha_t^{hybrid} = P_t \cdot \alpha_t^{content} + (1 - P_t) \cdot \alpha_t^{link}$$ [3]

wherein $\alpha_t^{hybrid}$ represents the mixed attention, $\alpha_t^{link}$ is the chain-based attention, $\alpha_t^{content}$ is the content-based attention, and $P_t$ is the weight.

(v) Make the weighted summation on the mixed attention and hidden representation h to obtain the attention vector.

The formula of calculating the attention vector is:

$$\alpha_t = \sum_{i=1}^{C} \alpha_{t,i}^{hybrid} h_i$$ [4]

wherein C is the total amount of the information field content in the structured data.

(2) Output the LSTM Score.

According to FIG. 7, the LSTM score can be obtained after the processing in blocks A and B.

Specifically, at block A, $X_t$ is calculated according to the following formula:

$$X_t = \tanh(W_d[\alpha_t; h_t'] + b_d)$$ [5]

wherein tanh represents the activation function in the neural network, at represents the mixed attention vector, $h_t'$ represents the state of LSTM, $W_d$ is the parameter matrix, and $b_d$ is the offset.

At block B, the LSTM score is calculated according to the following formula:

$$S_t^{LSTM} = W_s X_t + b_s$$ [6]

wherein $S_t^{LSTM}$ represents the LSTM score, $W_s$ is the parameter matrix, and $b_s$ is the offset.

(3) Calculate the Copy Score.

The field value $c_i$ is scored according to the hidden representation $h_i$ of the content (i.e., field value $c_i$) of the information field i in the structured data at the encoder side, where the score is used to represent the possibility that the field value $c_i$ is copied directly during the generation of the target reply text.

Here, when a word appears in the structured data, it has the following copy score:

$$s_{t,i} = \sigma(h_i^T W_c)h_t'$$ [7]

wherein $s_{t,i}$ is a real number, i=1, . . . , C represents the number of information field contents in the structured data, $W_c$ is the parameter matrix, and $h_t'$ is the decoding state, i.e., the state of LSTM.

If the field value $c_i$ appears multiple times in the structured data, the copy score is calculated as follows:

$$s_t^{copy}(w) = \sum_{i=1}^{C} s_{t,i} \cdot II_{\{c_i = w\}}$$ [8]

wherein II $\{c_i=w\}$ is a Boolean variable, and represents whether the field value $c_i$ is the same as the candidate word w under consideration.

(4) Calculate the Probability Distribution Based on the LSTM Score and the Copy Score.

According to FIG. 7, at C, the probability distribution of candidate words is calculated according to the following formula:

$$s_t(w) = s_t^{LSTM}(w) + s_t^{copy}(w)$$ [9]

$$P_t(w) = \text{soft max}(s_t(w)) = \frac{\exp\{s_t(w)\}}{\sum_{w' \in v \cup C} \exp\{s_t(w')\}}$$ [10]

wherein $P_t(w)$ is the probability distribution of the candidate word w, $s_t^{LSTM}(w)$ is the LSTM score of the candidate word w, $s_t^{copy}(w)$ is the copy score of the word w, v represents the vocabulary, and C represents a collection of words in a specific sample. In this way, the copy mechanism may generate a word from the vocabulary or copy a word directly from the information field content of the structured data.

This is useful in specific scenarios, because some information fields (for example, name) in the structured data of the audio/video may contain rare or unseen words, and the copy mechanism can process them naturally.

In some embodiments, in some embodiments of the present disclosure, the coverage mechanism may also be adopted during the process of training the reply text template based on the model, to avoid containing the duplicate content in the reply text.

FIG. 9 exemplarily shows an overall schematic diagram of the text generation model combining the neural network with templates and the mixed attention mechanism. As shown in the figure, z1 and z2 are in hidden states. Assuming that z1 is in the first state, it transfers to the second state after sending three words. The transfer model (shown as T) is a function of two states and the neural coding source x. The LSTM is used to define the emission distribution, and the LSTM uses the copy mechanism, mixed attention mechanism and coverage mechanism. The LSTM on the left in the figure generates the words y1, y2 and y3. After the transfer, the next word y4 is generated by another LSTM (the LSTM on the right side of the figure) and is independent of the words generated above. y1, y2, and y3 form a segment, and the segment may be composed of one or more words.

In an embodiment of the present disclosure, based on the above hidden semi-Markov model, after the probability distribution of each segment of the reply text is obtained, each segment corresponds to a label (latent-state) to form a label sequence, which may serve as a text reply template, for example:

the reply text template represented by the label sequence is:

z(=55, 59, 12, 3, . . .

wherein 55, 59, 12, 3 represent the corresponding segments, for example, the segment represented by 59 may be "is a film", "is film", "is" or the like, and each word in the segment represented by 59 may be used in combination with other segments. The position of 55 is the information field name "film title_1", and the position of 12 is the information field name "director name_1". The position of 3 may be "director", "producer director", "guide" or the like.

If the content of "film title 1" is "Titanic" and the content of "director name_1" is "James Cameron", then the sentence represented by the above template is:

[Titanic]$_{55}$ [is a film]$_{59}$ [James Cameron]$_{12}$ [director]$_{3}$ . . . .

The number of reply text templates obtained based on the training of the above model may be large. When the server generates the reply text according to the query command, there may be a larger processing delay if all the candidate reply text templates obtained by training are used. In order to solve this problem, in an embodiment of the present disclosure, after the candidate reply text templates are obtained based on the training of the above model, a certain number of templates may be selected from them as the templates used in generating the reply text according to the query command, wherein the number of selected templates may be set, for example, 100 reply text templates are selected. The sentence pattern of the generated reply text may be controlled by manipulating these text reply templates.

Based on a combination of one or more embodiments described above, FIG. 10 exemplarily shows a process of a model training method in an embodiment of the present disclosure. As shown in the figure, the following operations are performed according to a set period.

S1001: collecting and integrating the related information of the audio/video to obtain the structured data (attribute information) of the audio/video, and establishing an ES index of the structured data of the audio/video.

Here, the content in the structured data of the audio/video and the content source may refer to the foregoing embodiments.

S1002: manually labeling the reply texts for the structured data of a limited number of audios and videos, to obtain the sample data for training the reply text generation model.

In this step, the reply text generation annotations may be performed on a limited number of audios and videos, such as classic, popular or high-rated film works, where each audio/video may give multiple reply texts.

S1003: performing the de-semantic preprocessing on the manually labeled reply texts.

S1004: training the reply text generation model by using the sample data.

The specific implementations of the steps in the above process may refer to the foregoing embodiments, and will not be repeated here.

FIG. 11 exemplarily shows an audio/video query process in an embodiment of the present disclosure. This process may be performed by a smart device (such as a smart television, smart speaker or smart phone, etc.). In this embodiment, this process is performed by a smart television as an example. As shown in FIG. 10, the process may include the following steps.

S1100: the smart television sends a query command including a keyword to a server upon receiving a query request for audio/video from a user.

In this step, the user may input the query request in text form by operating the user interface through a remote controller, or may input query request by voice. The query request carries the keyword for querying a target audio/video, and the smart television can extract the query keyword and send the query command containing the keyword to the server.

In some embodiments, the smart television may perform the denoise (including removing echo and environmental noise) on the query request to obtain the clean query request text, and then send the query command to the server, wherein the query command may carry the query request text.

In the embodiments of the present disclosure, there is no limitation on the way of user input. For example, the user may input the query request by voice, or may input the information on a soft keyboard through the remote controller.

S1101: the server searches the target audio/video according to the keyword carried in the query command and obtains the attribute information of the target audio/video.

In this step, the server may search the structured data (attribute information) of the corresponding audio/video according to the query keyword. For example, by taking the user request to query a film work as an example, the query command includes the name of the film work, and after extracting the name of the film work, the server may search the audio/video database (that is used to store the attribute information of the audio/video) according to the name of the film work, to obtain the structured data (attribute information) of the target film work.

In some embodiments, if an ES index is established in advance for the attribute information of the audio/video, the attribute information of the target audio/video may be obtained according to the ES index established in advance for the attribute information of the target audio/video.

S1102: the server obtains the resource information of the target audio/video according to the keyword in the query command.

Here, the resource information of the target audio/video may include the URI (Uniform Resource Identifier) or other information of the target audio/video.

S1103: the server generates a reply text by using the attribute information of the target audio/video according to the reply text template trained based on a reply text generation model.

Here, the principle of the reply text generation model may refer to the foregoing embodiments.

S1104: the server sends the reply text and the media resource information (media resource information) to the smart television.

S1105: after receiving the reply text and the media resource information, the smart television presents the media resource information in the first area on the user interface and presents the reply text in the second area on the user interface. Further, the reply text may also be output by voice.

The timing of the steps of the above process is not limited strictly in the embodiments of the present disclosure. For example, S1101 may be performed before S1102, or S1101 and S1102 may be performed in parallel.

In some embodiments of the present disclosure, the number of generated reply texts may be one or multiple. For example, when multiple reply text templates are selected for generating the reply texts, the reply text model outputs multiple candidate reply texts.

For example, the method of generating the reply text by using the attribute information of the target audio/video according to the reply text template trained based on the reply text generation model may include:

selecting a trained reply text template, that is represented as: $z^{(i)}=z_1^{(i)}, \ldots, z_s^{(i)}$, wherein $z_s^{(i)}$ represents the $s^{th}$ discrete segment in the ith reply text template, for example, in FIG. 8, if y1, y2, and y3 constitutes a segment, then y4 is also a segment. According to the structured data (attribute information) of the target audio/video, the reply text is obtained by the following formula:

$$\hat{y}^{(i)} = \arg\max_{y'}(y', z^{(i)} \mid x) \qquad [11]$$

If there are multiple reply text templates, the corresponding reply text is generated according to the above method for each reply text template, thereby obtaining multiple candidate reply texts.

For the case where the model generates multiple candidate reply texts, one of the multiple candidate reply texts may be selected as the reply text that needs to be output to the user by voice.

It is possible to randomly select a reply text from the multiple candidate reply texts. It is also possible to select according to a pre-configured selection strategy. For example, the pre-configured selection strategy is a query request for the same audio/video, and a reply text is selected from multiple candidate reply texts in the polling manner. It is also possible to score each candidate reply text according to a scoring strategy and select the best reply text according to the scoring result. For example, the scoring strategy may consider the smoothness of the generated text and the relevance to the film theme, and the reply text with a high score is selected when the candidate reply text is selected.

For example, for multiple candidate reply texts output from the model, the score of each candidate reply text can be determined respectively according to the score corresponding to the comment information in the candidate reply text, and a reply text is selected from the multiple candidate reply texts according to the score of each candidate reply text.

More specifically, the scores corresponding to the evaluation words may be queried according to the sentiment words in the candidate reply text; and for each candidate reply text, the scores of the sentiment words in the candidate reply text are accumulated to obtain the score corresponding to the candidate reply text.

In some embodiments, in some embodiments of the present disclosure, when the reply text generation model is used to generate the reply text, the beam search mechanism may also be used to obtain a generation sequence with the maximum conditional probability.

Specifically, with the beam search mechanism, multiple preferred candidate words are selected when the candidate words are selected according to the probability distribution of the candidate words at each step, where the number of the selected candidate words acts as "beam width", and the cumulative score of all previous candidate words are recorded, to thereby search for the sequence closer to the overall best.

Taking FIG. 9 as an example, a LSTM generates a segment, and a segment may contain one or more words. If a segment generated by the LSTM includes multiple words, the number (equal to a value of "beam width") of candidate words is reserved when each word is generated, so that the overall probability distribution of this segment is largest. The beam search may be used to approximate the argmax function in the formula (11). The beam search is used in the LSTM decoding process, and performed on one segment (y1y2y3). After two steps, only the best one in the previous step is retained.

In some embodiments of the present disclosure, the de-semantic processing may further be performed. The de-semantic processing may include: processing before model training, processing before generating the reply text by using the reply text generation model, and processing after generating the reply text.

(1) De-Semantic Processing Before Model Training

Before the model training, the de-semantic processing may be performed on the structured data (attribute information) of the audio/video as the training sample and the manually annotated reply text, for example, the work name, person name (cast, director), character name and the like in the structured data may be replaced with the identifiers of the corresponding information field names (such as labeled fields).

The subscripts of the information field values of the structured data (attribute information) of the audio/video all have serial numbers, such as: "actor_1: Leonardo DiCaprio, actor_2: Kate Winslet". The de-semantic method is: replacing the specific work name, person name (actor, director), and character name in the content value of the information field in the structured data and the human-annotated natural sentences with the corresponding labeled fields.

For example, for a given structured data: [film title_1: Titanic, actor 1:
Leonardo DiCaprio, actor_2: Kate Winslet, director_1: James • Cameron, release time_1: 1997, genre_1: Love], and its corresponding human-annotated natural sentence "the "Titanic" is an affection film directed by James Cameron and starring Leonardo DiCaprio and Kate Winslet, which was released in 1997", the de-semantic preprocessing module will replace "Titanic", "Leonardo DiCaprio", "Kate Winslet", "James Cameron" and "1997" in the structured data and corresponding sentence with "film title", "actor 1", "actor_2", "director" and "release time".

(2) De-Semantic Processing Before Generating the Reply Text Based on the Reply Text Generation Model Before the model is used to output the reply text according to the input structured data (attribute information) of the audio/video, the de-semantic processing may be performed on the input structured data (attribute information) of the audio/video, for example, the work name, person name (actor, director), character name and the like in the structured data may be replaced with the identifiers of the corresponding information field names (such as labeled fields).

(3) Processing after Generating the Reply Text

According to the above model, the output reply text may include the identifiers of one or more information field names. For the reply text including the identifiers of the information field names, the identifiers of the information field names in the reply text may be replaced with the content of the corresponding information fields in the structured data of the target audio/video, such as the work name, person name (cast, director), character name and the like.

For example, the structured data of the target audio/video is:

work name_1: myth, actor_1: Jackie Chan, actor_2: Jin Xishan, director_1: Tang Jili, type_1: love, release time_1: 2005.

The reply text generated by the model is:

"work name_1" is a love movie starring actor 1 and actor_2, which was released in 2005. Please enjoy it.

According to the field number in the above reply text, the following reply text is obtained after replacing with the content of the corresponding information fields in the structured data of the target audio/video:

"Myth" is a love movie starring Jackie Chan and Jin Xishan, which was released in 2005. Please enjoy it.

The de-semantic preprocessing may reduce the size of the vocabulary and improve the generalization ability of the model.

In some embodiments, in order to further make the expression of the reply text more vivid to attract users, in an embodiment of the present disclosure, after the reply text is generated, the name in the reply text may be replaced with the corresponding nickname according to the correspondence between names and nicknames in the reply text, wherein the correspondence between names and nicknames may be preset. For example, if the reply text contains the names of the film and television characters such as actors, singers and the like, they may be mapped to their well-known nicknames, thereby making the expression of the reply text more vivid.

According to a combination of one or more embodiments described above, FIGS. 12A and 12B exemplarily show schematic diagrams when applied to a smart television.

When a user says "I want to watch the movie <Three Against the World>", the smart television sends a query command carrying the movie name <Three Against the World> to the server. In response to the query command, the server generates a reply text and retrieves the media resource information of the movie, and returns them to the smart television. After receiving the reply text and media resource information sent from the server, the smart television displays them on the user interface. As shown in FIG. 12A, the voice text input from the user and the reply text "Let us watch the Hong Kong action movie <Three Against the World>, and see Liu Dehua's wonderful fight scenes" received from the server are displayed in the area 1001 of the user interface, and the media resource information of the movie is displayed in the area 1002.

When the user says "I want to watch the movie <Three Against the World>" again, the smart television sends a query command carrying the movie name <Three Against the World> to the server. In response to the query command, the server generates a reply text and retrieves the media resource information of the movie, and returns them to the smart television. After receiving the reply text and media resource information sent from the server, the smart television displays them on the user interface. As shown in FIG. 12B, the voice text input from the user and the reply text "Please enjoy the action blockbuster <Three Against the World> starring Liu Dehua, having amazing scenes and you cannot miss it" received from the server are displayed in the area 1001 of the user interface, and the media resource information of the movie is displayed in the area 1002.

It can be seen that when the server can generate reply texts with different contents for two query requests for the same audio/video one after another when generating the reply texts, thereby improving the user experience.

In summary, according to the embodiments of the present di, in response to the user's query request for audio or video, the generated reply text result can be controlled. Specifically, by changing the reply text template, different reply texts may be obtained for the query request for the same audio/video. Also, in response to the user's query request, it is also possible to make good interpretability of the generated reply text, because the discrete state is aligned with a specific field. It is generally easy to automatically infer which field corresponds to a specific potential state, so that the users can choose the templates best meeting their needs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
a user input interface configured to receive an input from a user;
a display configured to present a user interface;
a controller in communication with the user input interface and an audio output and configured to:
in response to a first query request for a first audio/video from the user input interface, send a first query command comprising a keyword to a server, wherein the server is configured to determine first media resource information of a corresponding target audio/video according to the keyword in response to receiving the first query command, and generate a first reply text comprising first comment information of the first audio/video according to the keyword, wherein the first comment information is configured for describing a first aspect of the first audio/video;
receive the first media resource information and the first reply text sent from the server;
control the display to present the first media resource information in a first area on the user interface and present the first reply text in a second area on the user interface, wherein information of the first query request from the user for the first audio/video is also displayed on the second area of the user interface;

in response to a second query request for the first audio/video input from the user immediately after the first query request, send a second query command to the server, wherein the server is further configured to: generate a second reply text for the second query command, and the second reply text has second comment information, wherein the second comment information is configured for describing a second aspect of the first audio/video and is different from first comment information;

receive the second reply text and second media resource information sent from the server corresponding to the second query command; and control the display to present the second media resource information in the first area on the user interface and present the second reply text in the second area on the user interface, wherein the first comment information and second comment information comprise sentiment words and/or tone enhancement words, and the first comment information and second comment information are different, corresponding to the first and second aspects of the same first audio/video based on the first and second query requests respectively, in at least one of following aspects: expression approach, order of words in the first and second reply texts, number of words contained in the first and second reply texts, modal particles or sentiment words contained in the first and second reply texts, wherein information of the second query request from the user for the first audio/video is also displayed on the second area of the user interface, and the first query request on the second area of the user interface is identical with the second query request on the second area of the user interface.

2. The display apparatus according to claim 1, wherein, the first reply text is generated by determining attribute information corresponding to the keyword according to the keyword in the first query command, and generating the first reply text according to a preset template selected randomly from a plurality of preset templates and the attribute information.

3. The display apparatus according to claim 2, wherein the attribute information comprises: one or any combination of audio/video name, actor name, director name, release time, region, genre, character name, plot information, comment information, classic lines, and theme song name.

4. The display apparatus according to claim 1, wherein the first reply text is generated by:

determining attribute information corresponding to the keyword in the first query command, and selecting one of multiple candidate reply texts generated according to the attribute information.

5. The display apparatus according to claim 1, further comprising a speaker, wherein, the controller is further configured to:

control the speaker to output an audio of the first reply text after receiving the first media resource information and the first reply text sent from the server.

6. The display apparatus according to claim 1, wherein the second reply text is generated by:

determining attribute information corresponding to the keyword in the second query command, and generating the second reply text according to a preset template selected randomly from a plurality of preset templates and the attribute information.

7. The display apparatus according to claim 1, wherein the second reply text is generated by:

determining attribute information corresponding to the keyword in the second query command, and inputting the attribute information into a preset model, wherein the preset model is configured to generate multiple candidate reply texts according to the input attribute information and preset multiple templates; and selecting one of the multiple candidate reply texts as the second reply text.

8. The display apparatus according to claim 7, wherein the preset model comprises Hidden Semi-Markov model.

9. The display apparatus according to claim 7, wherein the second reply text is generated by:

selecting one of the multiple candidate reply texts as the second reply text in accordance with a preset rule, to allow reply texts for two consecutive query commands for the same first audio/video to have different contents.

10. The display apparatus according to claim 1, wherein the display apparatus further comprises a speaker, and the controller is configured to:

control the speaker to output the first reply text in a first tone, and control the speaker output the second reply text in a second tone different from the first tone.

11. The display apparatus according to claim 1, wherein the controller is further configured to:

control the display to present the first media resource information, comprising a uniform resource locator (URL), in the first area on the user interface.

12. A method fora display apparatus comprising:

receiving a first query request for a first audio/video from a user input interface, in response to the first query request, sending a first query command comprising a keyword to a server, wherein the server is configured to determine first media resource information of a corresponding target audio/video according to the keyword in response to receiving the first query command, and generate a first reply text comprising comment information of the first audio/video according to the keyword;

receiving the first media resource information and the first reply text sent from the server;

controlling a display of the display apparatus to present the first media resource information in a first area on a user interface of the display apparatus and present the first reply text in a second area on the user interface, wherein information of the first query request from the user for the first audio/video is also displayed on the second area of the user interface;

receiving a second query request from the user immediately after the first query request, in response to the second query request for the first audio/video, sending a second query command to the server, wherein the server is further configured to: generate a second reply text for the second query command, and the second reply text has second comment information, wherein the second comment information is configured for describing a second aspect of the first audio/video and is different from first comment information;

receiving the second reply text and second media resource information sent from the server corresponding to the second query command; and controlling the display to present the second media resource information in the first area on the user interface and present the second reply text in the second area on the user interface, wherein the first comment information and second comment information comprise sentiment words and/or tone enhancement words, and the first comment information and second comment information are different, corresponding to the first and second aspects of the same first audio/video based on the first and second query requests respectively, in at least one of following aspects: expression approach, order of words in the first and second reply texts, number of words contained in the first and second reply texts, modal particles or sentiment words contained in the first and second reply texts, wherein information of the second query request from the user for the first audio/video is also displayed on the second area of the user interface, and the first query request on the second area of the user interface is identical with the second query request on the second area of the user interface.

13. The method according to claim 12, wherein the first reply text is generated by:

determining attribute information corresponding to the keyword in the first query command, and selecting one of multiple candidate reply texts generated according to the attribute information.

14. The method according to claim 13, wherein the attribute information comprises: one or any combination of audio/video name, actor name, director name, release time, region, genre, character name, plot information, comment information, classic lines, and theme song name.

15. The method according to claim 12, further comprising:

controlling a speaker of the display apparatus to output an audio of the first reply text after receiving the first media resource information and the first reply text sent from the server.

16. The method according to claim 15, wherein the second reply text is generated by:

selecting one of the multiple candidate reply texts as the second reply text in accordance with a preset rule, to allow reply texts for two consecutive query commands for the same first audio/video to have different contents.

17. The method according to claim 12, wherein the second reply text is generated by:

determining attribute information corresponding to the keyword in the second query command, and inputting the attribute information into a preset model, wherein the preset model is configured to generate multiple candidate reply texts according to the input attribute information and preset multiple templates; and selecting one of the multiple candidate reply texts as the second reply text.

18. The method according to claim 12, further comprising:

controlling a speaker of the display apparatus to output the first reply text in a first tone, and controlling the speaker output the second reply text in a second tone different from the first tone.

* * * * *